US012749112B2

(12) United States Patent
Lombardi

(10) Patent No.: US 12,749,112 B2
(45) Date of Patent: Sep. 29, 2026

(54) SYSTEMS AND METHODS FOR DEMOCRATICALLY SENDING A CAPITAL MEDIUM VIA DEVICES WITH COMPUTATIONAL CAPABILITIES

(71) Applicant: Nathan Lombardi, New York, NY (US)

(72) Inventor: Nathan Lombardi, New York, NY (US)

( * ) Notice: Subject to any disclaimer, the term of this patent is extended or adjusted under 35 U.S.C. 154(b) by 4 days.

(21) Appl. No.: 18/745,596

(22) Filed: Jun. 17, 2024

(65) Prior Publication Data

US 2025/0384486 A1 Dec. 18, 2025

(51) Int. Cl.
*G06Q 40/04* (2012.01)
*G06Q 20/06* (2012.01)
*G06Q 20/36* (2012.01)

(52) U.S. Cl.
CPC ........... *G06Q 40/04* (2013.01); *G06Q 20/065* (2013.01); *G06Q 20/36* (2013.01); *G06Q 2220/00* (2013.01)

(58) Field of Classification Search
USPC .......................................................... 705/64
See application file for complete search history.

(56) References Cited

U.S. PATENT DOCUMENTS

| | | | |
|---|---|---|---|
| 9,027,074 | B2 | 5/2015 | Huegel et al. |
| 10,015,149 | B2 | 7/2018 | Dare et al. |
| 10,455,297 | B1 * | 10/2019 | Mahyar et al. |
| 10,891,642 | B2 | 1/2021 | Foroutan |
| 11,769,154 | B1 | 9/2023 | Cash et al. |
| 2014/0033036 | A1 * | 1/2014 | Gaur et al. |
| 2015/0279139 | A1 | 10/2015 | Kincaid |
| 2017/0150197 | A1 * | 5/2017 | Zograbian |
| 2020/0366959 | A1 * | 11/2020 | Pau et al. |
| 2022/0351279 | A1 * | 11/2022 | Gasca et al. |

(Continued)

FOREIGN PATENT DOCUMENTS

JP 2001282954 A 10/2001

OTHER PUBLICATIONS

Toward a Decentralized, Trust-Less Marketplace for Brokered IoT Data Trading Using Blockchain (Year: 2019).*

(Continued)

*Primary Examiner* — Nilesh B Khatri
*Assistant Examiner* — Yin Y Choi
(74) *Attorney, Agent, or Firm* — Venable LLP; Yeon Jae Ko; Griffin A. A. Deadwick

(57) ABSTRACT

A system for allowing transferring a capital medium to end-users. One or more application server terminals are in communication with a plurality of user terminals connected to a network, at least one user terminal being permitted to provide user-information blocks to the one or more application server terminals. The application server is configured to receive at least one user-information block in the network and at least one selection data in the network, and the application server is configured to provide one or more of the user-information blocks to a content handler. The application server includes one or more application server terminals in communication with a client terminal. The application server uses a payment generator, configured to receive a trigger indicator, to transfer an amount of the capital medium to one or more wallets.

16 Claims, 8 Drawing Sheets

(56) References Cited

U.S. PATENT DOCUMENTS

| | | | |
|---|---|---|---|
| 2023/0394093 | A1 | 12/2023 | Hardy |
| 2024/0022908 | A1 * | 1/2024 | Baskaran et al. |
| 2024/0056619 | A1 * | 2/2024 | Fiorentino |

OTHER PUBLICATIONS

A complete guide to the Hamilton lottery, Adam Feldman, Jan. 31, 2024 (timeout.com/newyork/theater/hamilton-lottery).

Playbill Inc., Playbill Passport App Launches: The First-Ever Mobile Companion to Broadway Programs, Jan. 1, 2016 (https://playbill.com/article/playbill-passport-app-launches-the-first-ever-mobile-companion-to-broadway-programs-com-377359#:~:text=News%20Playbill%20Passport%20App%20Launches,Passport%2C%20a%20mobile%2C%20interactive%20companion).

Fandom | About US, Fandom, Last Accessed Jun. 18, 2024 (https://about.fandom.com/about).

* cited by examiner

SYSTEMS AND METHODS FOR DEMOCRATICALLY SENDING A CAPITAL MEDIUM VIA DEVICES WITH COMPUTATIONAL CAPABILITIES

BACKGROUND

1. Technical Field

This invention relates to a systems and methods involving hardware and software of devices, with computational capabilities, for transferring a capital medium.

2. Introduction

This invention relates to secure systems and methods for validating users and sending users currencies, securities, or any digital and/or digitally represented asset of value that does not necessarily meet the classification of a currency or a security.

With the advent of new computer technology, such as easy-access applications for phone devices, the exchanging of money across networks, whether via centralized or decentralized digital ledgers, has become a major convenience for the everyday person. However, security issues arise when sending money over networks and digital and/or electronic devices. Fraudsters and thieves may instigate fraudulent transactions that deprive capital owners of their money, whether that money is digital coins, company-issued tokens, cryptocurrencies, or national currencies.

When transactions are community based—for example, communities such as an online community or group; a mobile community or group; a cryptocurrency community or group; or a digital, online, blockchain, and/or cryptocurrency cooperative—determining who to send a payment to can become difficult, as a work-completer who completed work for the group, community, or cooperative may have difficulty establishing that he or she is deserving of a payment because he or she, in fact, did complete work deserving of said payment.

Thus, a system and/or method would have to be in place where somehow the work-completer can validate or have validated, via electronic or digital security procedures and/or devices, that he or she did in fact complete the work, such that the work-completer's payment is not fraudulently claimed by a thief who did not complete the work.

SUMMARY

Aspects of this invention herein may address the issues discussed by providing systems and methods to securely send capital mediums over a network to a user after the user meets validation requirements showing that the user completed work or a task entitling the user to said capital mediums.

A set of embodiments includes a system for transferring a capital medium to end-users. The system comprises one or more application server terminals in communication with a plurality of user terminals connected to a network, at least one user terminal being permitted to provide user-information blocks to the one or more application server terminals; an application server connected to the network, one or more application server terminals in communication with client terminal, and a payment generator, the payment generator being configured to receive the trigger indicator and being configured to transfer an amount of the capital medium to one or more wallets corresponding to each user terminal corresponding to the at least one of the selected user-information blocks of the client-matter group of the user-information blocks. The application server is configured to receive at least some user-information blocks in the network and at least some selection data in the network. The application server is configured to provide one or more of the user-information blocks to a content handler. The content handler comprises a display medium and a quantifying unit. The display medium is configured to organize user information of the one or more of the user-information blocks. The quantifying unit is configured to count a set of selection data corresponding to each of the one or more of the user-information blocks and is configured to create a comparing value for each of the one or more of the user-information blocks. The application server allows a client terminal to read one or more of a group of selected user-information blocks corresponding to a client-matter group of the user-information blocks. The application server allows the client terminal to cause a trigger indicator, the trigger indicator encoded to correspond to at least one of the selected user-information blocks of the client-matter group of the user-information blocks.

Some embodiments of the second set of embodiments further comprise the client terminal being allowed to send pre-made digital information to the application server via the network. At least one user terminal is allowed to read option digital information of the pre-made digital information. The at least one user terminal is prompted by the application server to send one or more choice user-information blocks with at least one selection data point and a digital reference marker, configured to correspond to the pre-made digital information, appended to the one or more choice user-information blocks.

Some embodiments of the set of embodiments further comprise the display medium being configured to allow each user terminal to manually provide selection data to the application server via the network.

Some embodiments of the set of embodiments further comprise the capital medium being more specifically an application coin.

Some embodiments of the set of embodiments further comprise the capital medium being more specifically a cryptocurrency.

Some embodiments of the set of embodiments further comprise the content handler interacting with an AI source to provide the client terminal at least one user-information block.

Some embodiments of the set of embodiments further comprise the application server being configured to directly or indirectly maintain the wallet.

Some embodiments of the set of embodiments further comprise the wallet being a bank account maintained by an external server.

Another set of embodiments includes a method for transferring a capital medium to end-users, the method comprising: receiving information in the form of user-information blocks from a plurality of user terminals connected to a network by an application server connected to the network, transferring information to a client terminal connected to a network from an application server connected to the network, and sending an amount of the capital medium by way of a payment generator, the payment generator configured to receive the trigger indicator and configured to transfer an amount of the capital medium to one or more wallets corresponding to each user terminal corresponding to the at least one of the selected user-information blocks of the client-matter group of the user-information blocks. The at least one user terminal of the plurality of the user terminals is allowed by the application server to provide at least one user-information block and to provide selection data to a network. The application server is configured to receive at least some user-information blocks in the network and at least some selection data in the network, and the application server is configured to provide one or more of the user-information blocks to a content handler. A display medium of the content handler is configured to organize user information of the one or more of the user-information blocks. A quantifying unit of the content handler is configured to count a set of selection data corresponding to each of the one or more of the user-information blocks and create a comparing value for each of the one or more of the user-information blocks. The client terminal is allowed to read one or more of selected user-information blocks corresponding to a client-matter group of the user-information blocks. The client terminal is allowed to cause a trigger indicator, the trigger indicator encoded to correspond to at least one of the selected user-information blocks of the client-matter group of the user-information blocks.

Some embodiments of the another set of embodiments further comprise allowing the client terminal to send pre-made digital information to the application server via the network. At least one user terminal is allowed to read option digital information of the pre-made digital information. The at least one user terminal is prompted by the application server to send one or more choice user-information blocks with at least one selection data point and a digital reference marker, configured to correspond to the pre-made digital information, appended to the one or more choice user-information blocks.

Some embodiments of the another set of embodiments further comprise configuring the quantifying unit of the content handler to provide one or more of the comparing values to the display medium of the content handler.

Some embodiments of the another set of embodiments further comprise transferring a national currency as the amount of the capital medium.

Some embodiments of the another set of embodiments further comprise configuring the application server to authenticate user terminals through an authentication validation.

Some embodiments of the another set of embodiments further comprise configuring the display medium of the content handler to provide user terminals an input box to input user-information blocks.

Some embodiments of the another set of embodiments further comprise configuring the application server to perform a removal act upon at least one user-information block.

Some embodiments of the another set of embodiments further comprise configuring the application server to deploy an AI source to perform a removal act upon at least one user-information block received from the network.

An even another set of embodiments includes a system for transferring a capital medium to end-users, the system comprising: one or more application server terminals in communication a plurality of user terminals connected to a public network, at least one user terminal being permitted to provide user-information blocks to the one or more application server terminals, an application server connected to the public network, and a payment generator. At least one application server terminal is in communication with a user terminal that is a personal processing terminal. The at least one user terminal of the plurality of the user terminals is allowed to provide at least one user-information block and providing selection data to the application server via the public network. The application server is configured to receive at least some user-information blocks in the public network and at least some selection data in the public network. The application server is configured to provide one or more of the user-information blocks to a content handler, the content handler comprising: a display medium and a quantifying unit. The display medium is configured to organize user information of the one or more of the user-information blocks. The quantifying unit is configured to count a set of selection data corresponding to each of the one or more of the user-information blocks and is configured to create a comparing value for each of the one or more of the user-information blocks. The application server is configured to distinguish the plurality of user terminals from one or more client terminals by providing one or more encoded user badges upon one or more communication addresses of at least one user terminal and providing one or more encoded client badges upon one or more communication addresses of at least one client terminal. The encoded user badges are configured to be distinguished from the encoded client badges by information-distinguishing strings. At least one of the one or more encoded user badges is configured to be provided to at least one display screen by the display medium. At least one of the one or more encoded client badges is configured to be provided to at least one display screen by the display medium. The payment generator is configured to receive a trigger indicator, the trigger indicator corresponding to at least one of selected user-information blocks corresponding to a client-matter group of the user-information blocks. The payment generator is configured to transfer an amount of the capital medium to one or more wallets corresponding to each user terminal corresponding to the at least one of the selected user-information blocks of the client-matter group of the user-information blocks.

Some embodiments of the even another set of embodiments further comprise the client terminal being allowed to send pre-made digital information to the application server via network, wherein at least one user terminal is allowed to read option digital information of the pre-made digital information, and wherein the at least one user terminal is prompted by the application server to send one or more choice user-information blocks with at least one selection data point and a digital reference marker, configured to correspond to the pre-made digital information, appended to the one or more choice user-information blocks.

Some embodiments of the even another set of embodiments further comprise the personal processing terminal having a processing speed between 1 GHz and 4 GHz, a RAM-unit memory between 0.5 GB and 17.5 GB of RAM, and a display screen having a diagonal length between 3 in. and 30 in.

Some embodiments of the even another set of embodiments further comprise the display medium being configured to allow each user terminal to manually provide selection data to the application server via the public network.

BRIEF DESCRIPTION OF THE DRAWINGS

The figures found in the drawings depict the present invention by example and do not create limitations for this application. Reference numerals of the same number pointing at more than one aspect refer to the same or similar aspects.

DETAILED DESCRIPTION

Figure 1:
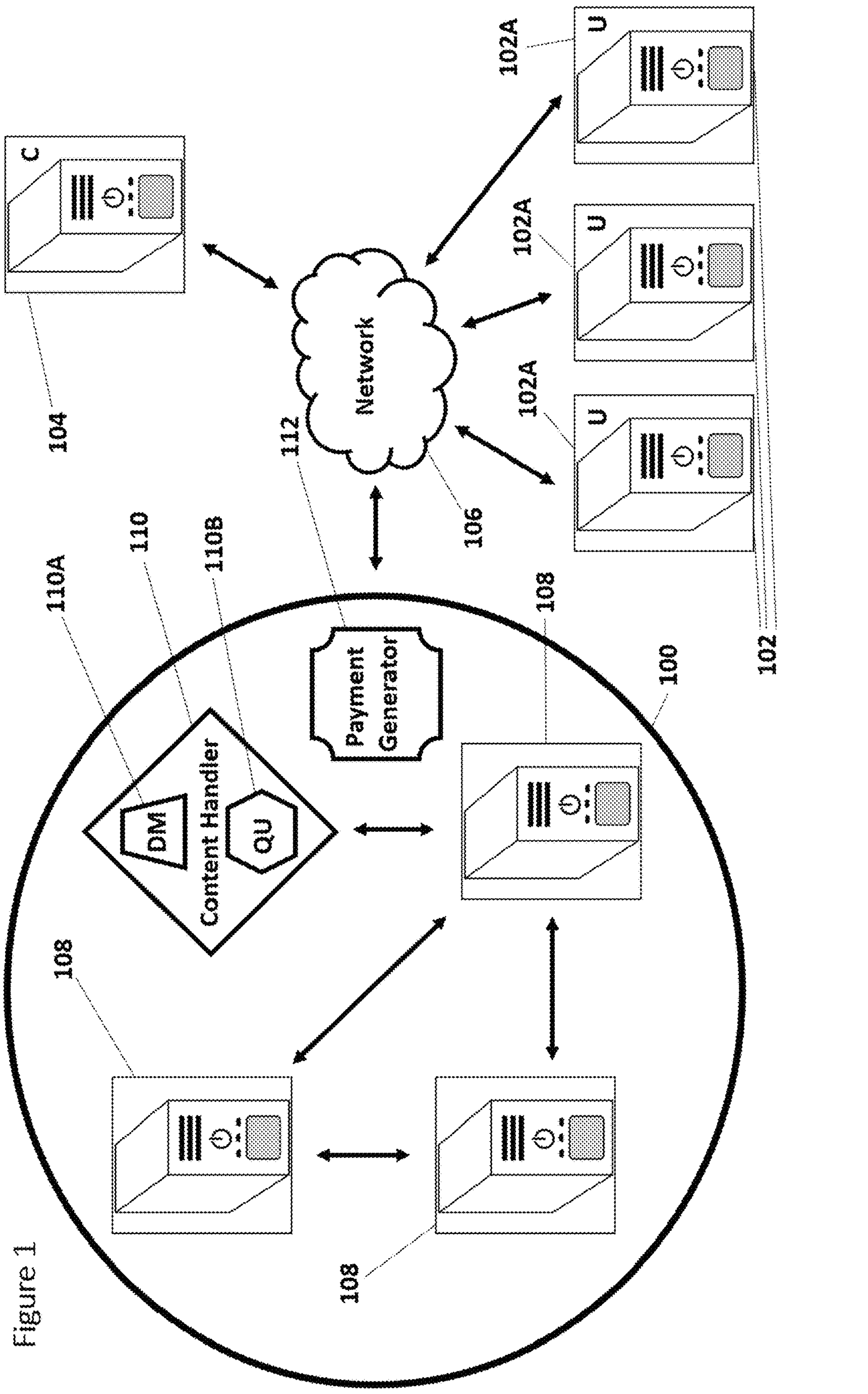
FIG. 1 illustrates an exemplary system for transferring a capital medium to end-users, wherein a content handler and a payment generator are part of an application server.

The present invention involves devices with computational capabilities with access to a network (106) to send payments and to confirm that each recipient of a given payment is owed the amount paid. The invention uses digital and/or computer systems and methods to allow for a democratic process of securely affirming the recipient of a payment such that a transaction may properly occur between a client and a user.

In aspects, a client may be a paying individual in a group, community, cooperative, organization, or like-collective or a representative of a paying group, community, cooperative, organization, or like-collective, or the client may be an individual who does not send a payment but, instead, authorizes a payment-managing server computer to send a payment to a user. The payment-managing server computer may be a computer of a payment-managing member of the group, community, cooperative, organization, or like-collective or may be a computer of a third party managing payments of the group, community, cooperative, organization, or like-collective. A group may be any collection of two or more individuals and/or entities engaged in or engaged with a common goal or at least sharing some commonality that serves as a connecting factor between the individuals and/or entities that brings the individuals and/or entities together. A community may be, but is not limited to, an online community, including an influencer community, the influencer community having followers of a celebrity or influencer, wherein said celebrity or influencer may be a representative of the influencer community. Other individuals may also be a representative of a community if the community broadly recognizes the other individuals' representative status and/or if an already established representative of the community affords such representative status to the other individuals. An organization may be, but is not limited to, a corporation, an LLC, a partnership, or any other type of business and/or company. A like-collective may be any collection of two or more individuals and/or entities with at least one shared aspect.

In aspects, the payment may be a transfer of an amount of a capital medium or amounts of multiple capital mediums. The capital medium may be a digital token, a company-issued currency for microtransactions, a cryptocurrency, a national currency, or any other asset accessed and/or exchanged digitally that has monetary value and may be purchased and/or exchanged for said value. The capital medium may also be a security. But the capital medium does not necessarily need to be a security or currency with a market value recognized by a country and/or a notable financial group. The capital medium may be a microtransaction currency only usable in a game or in an application (300). The capital medium may be a microtransaction currency of a video game.

In aspects, the client may ask for work in the form of tasks or suggestions to be done by a member of the group, community, cooperative, organization, or like-collective. A member of the group, community, cooperative, organization, or like-collective who performs the work—whether completing a task, providing a suggestion, or both—may be considered a user. The work may be highly involved and may require a specific set of skills and/or qualifications. The work may otherwise be publicly accessible to individuals and may be as simple as selecting from a set of options.

In aspects, the work may be completed physically, digitally, or in-part digitally and in-part physically. A digital payment, sent over a network (106), may be sent as compensation for the work after the work is completed, and the digital payment may be the transfer of amount(s) of one or more capital mediums.

In aspects, a computer and/or phone application (hereinafter, "application") (300) may determine and/or establish who is connected with work done and may allow community members to democratically select a user-information block representing the work, comprising the work, or consisting of the work. The user-information block is digital or electronic data transferrable from one digital and/or electronic device to another digital and/or electronic device over a network (106) and is more specifically sent out by a user. The user-information block may exist as digital or electronic text, digital or electronic characters, digital or electronic symbols, document files, photo files, digital or electronic photos, video files, digital or electronic videos, audio files, digital or electronic audio, audiovisual files, program files, application files, and any compilations and/or combinations thereof.

In aspects, selection of a user-information block may be performed by a user ticking up a countable tabulation associated the user-information block, wherein each instance of an up-tick individually comprises a count, a tally, a tab, a vote, or an itemization cast by a member of the group, community, cooperative, organization, or like-collective. Each count may be sent digitally and may correspond to the user-information block, and selection data comprises the count(s). Thus, the selection data allows the group, community, cooperative, organization, or like-collective to collectively and/or democratically suggest—or determine, in whole or in part—which user-information block the client is to choose or set of user-information blocks the client is to choose from, thereby suggesting or determining which user deserves payment for work.

In aspects, a client may read the user-information blocks associated with a particular work, such as a particular task for completion or a particular suggestion to be sent. Highly tabulated user-information blocks may have priority with regards to sending user-information blocks to the client. The client may then authorize the work completed and authorize a payment to a user associated with one of the highly tabulated user-information blocks.

In aspects, the client may receive a set of user-information blocks associated with a set of users. The set of user-information blocks may be selected as a high-tabulation group, which is a set of user-information blocks with the highest tabulations corresponding to and/or associated with the particular task or work. The client may perform an act of evaluation on which particular user of the set of users deserves a payment, the evaluation being based upon a particular user-information block that corresponds to the particular user. Upon determining the user-information block of the particular user who deserves payment, the client may then authorize the work completed and authorize a payment to the particular user (such as directing a payment to a device of the particular user, a bank account of the particular user, and/or to a system identification tag of the particular user, the system identification tag being within a system that connects the user to the client, such as a system connecting the group, community, cooperative, organization, or like-collective).

In aspects, the payment may be a capital medium in the form of a company-issued microtransaction medium. The company-issued microtransaction medium may be a digital coin. There may be a digital coin issued as payment when a user sends a user-information block to the client seeking suggestions, which may be called a suggestion coin. There may be a digital coin for providing user-information blocks corresponding to work, which may be called a work coin. There may be a digital coin that shares revenue received by the client as result of the work done by the user, which may be called a royalty coin. Further, in aspects, microtransaction token may be color-coated to represent each of the above types of digital coins.

In preferred embodiments, the system and method disclosed herein involve software and more than one digital device.

In embodiments, the system includes end-users, who are users capable of obtaining the capital medium. The capital medium may be transferred by the system.

Figure 2:
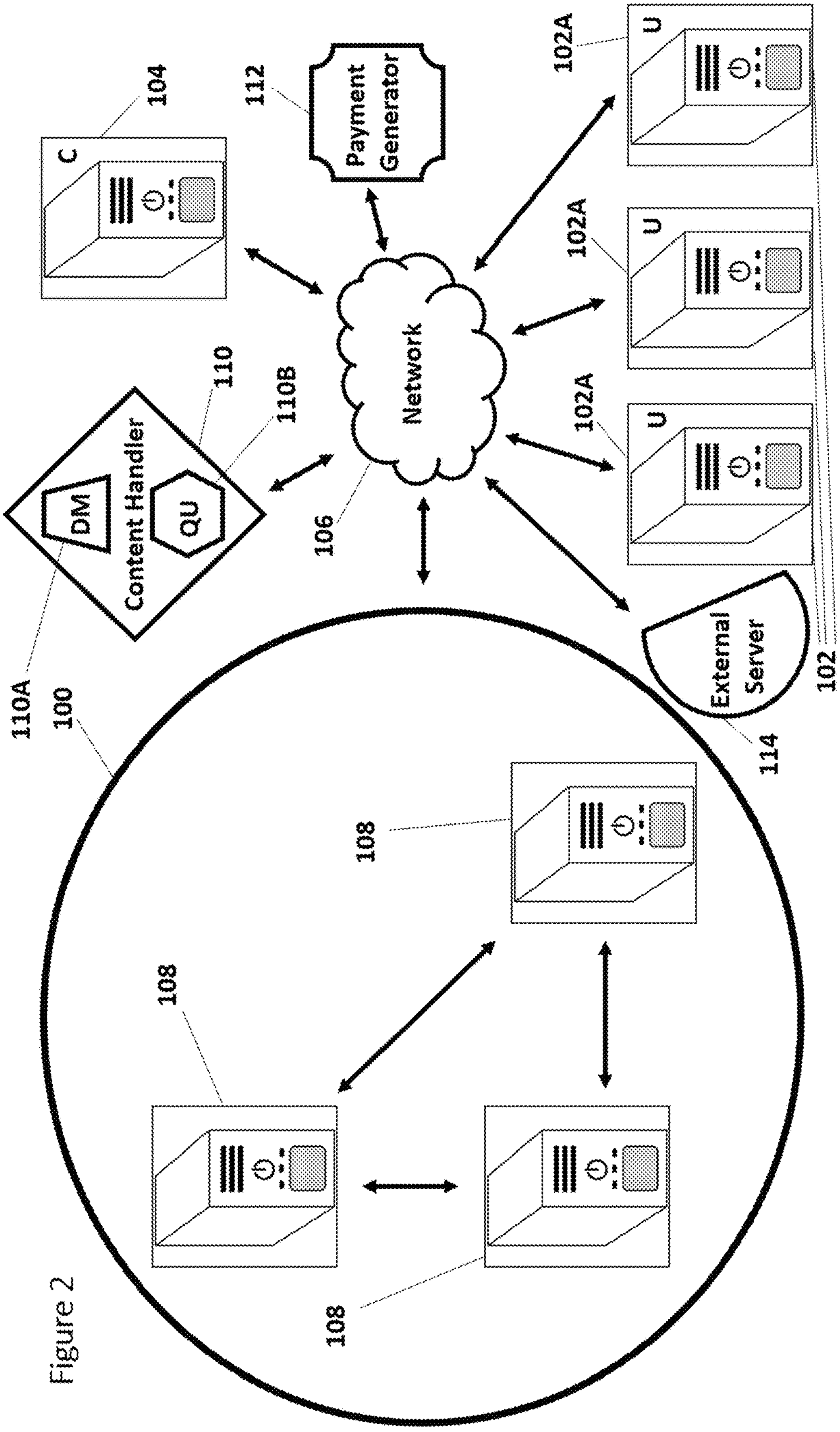
FIG. 2 illustrates an exemplary system for transferring a capital medium to end-users, wherein a content handler and a payment generator are external to an application server.

In embodiments, a user may utilize a user terminal (102A), as shown in FIGS. 1 and 2, which is any physical device that interacts with the application server (100) over a network (106) and has user-identifying information of the user and is used for at least one user purpose disclosed herein, wherein said digital device can communicate over the network (106). Examples of a user terminal (102A) may be a phone (202) accessing the application server (100) with user-identifying information of the user, a computer accessing the application server (100) with user-identifying information of the user, a server computer accessing the application server (100) with user-identifying information of the user, an Apple device accessing the application server (100) with user-identifying information of the user and capable of accessing a network (106), an Android device accessing the application server (100) with user-identifying information of the user and capable of accessing the network (106), a gaming device (such as a Nintendo, Switch, PlayStation, Xbox, etc.) with user-identifying information of the user and capable of accessing the network (106). A specific user terminal (102A) is not identified by the specific device used but, rather, a specific user terminal (102A) is identified by a user accessing the application server (100) with user-identifying information of the user on a device. Hence, a specific user terminal (102A) may exist on one device and then another device and still be considered the same specific user terminal (102A), but at least some user-identifying information of the specific user terminal (102A) must remain the same for the specific user terminal (102A) to be considered the same specific user terminal (102A). User-identifying information is any information that distinguishes one user from another user. In embodiments, user-identifying information may be provided to a terminal (108) by physically pressing buttons of a mouse (208) and/or keyboard (206) to input user information into the terminal for the purposes of accessing the terminal as a user terminal (102A).

Figure 3:
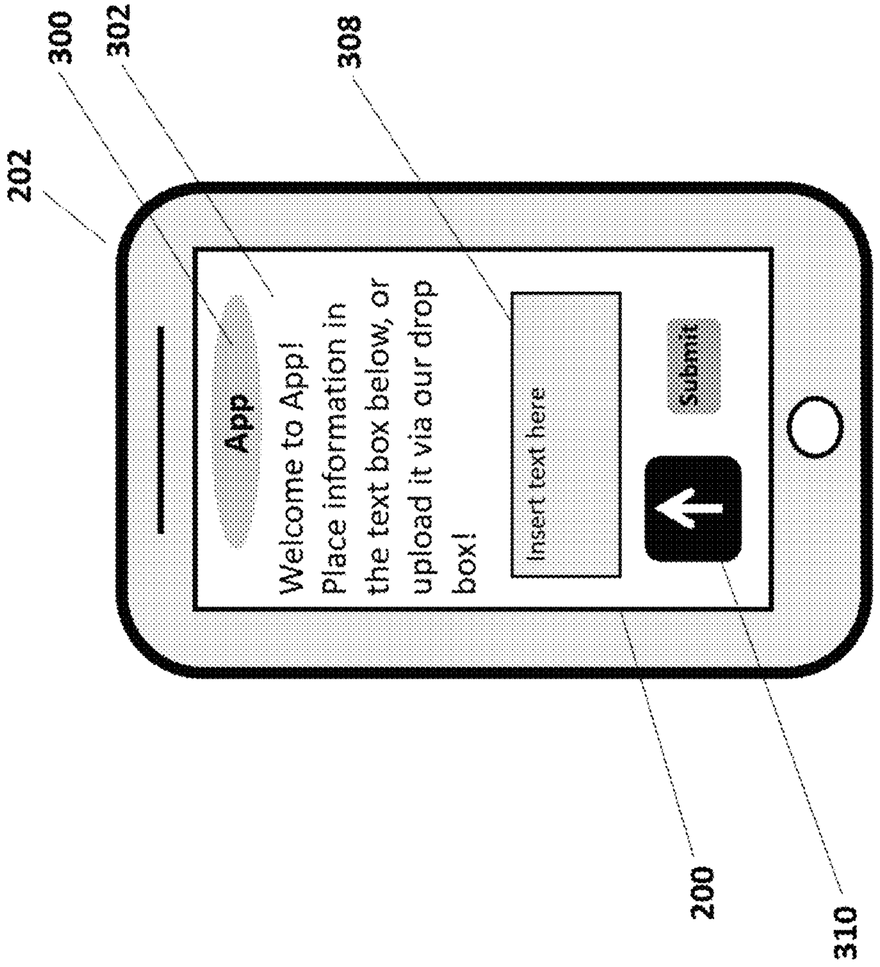
FIG. 3 illustrates an exemplary user terminal with a display screen interacting with an application and application server through graphical interface of the application.

In embodiments, a user terminal (102A) may be a personal processing terminal. A personal processing terminal may provide user-information blocks when the personal processing terminal is a user terminal. In embodiments, a personal processing terminal is any personal device that may be used for personal purposes and is registered with personal information of the user or a family member of the user. As seen in FIG. 3, the personal device could be a personal phone (202) of a user and/or the computer system of a user, wherein the personal phone (202) and/or the computer system of a user has some user-identifying information.

In embodiments, the personal processing terminal may include a processing speed of between 0.1 GHz and 8 GHz, such as 1 GHz-5 GHz, including 1.00 GHz-1.25 GHz, 1.00 GHz-1.50 GHz, 1.00 GHz-1.75 GHz, 1.00 GHz-2.00 GHz, 1.00 GHZ-2.25 GHz, 1.00 GHZ-2.50 GHz, 1.00 GHz-2.75 GHZ, 1.00 GHz-3.00 GHz, 1.00 GHz-3.25 GHZ, 1.00 GHZ-3.50 GHz, 1.00 GHz-3.75 GHz, 1.00 GHz-4.00 GHz, 1.00 GHz-4.25 GHZ, 1.00 GHz-4.50 GHz, 1.00 GHz-4.75 GHZ, 1.25 GHz-1.50 GHz, 1.25 GHZ-1.75 GHz, 1.25 GHz-2.00 GHz, 1.25 GHZ-2.25 GHz, 1.25 GHZ-2.50 GHz, 1.25 GHZ-2.75 GHz, 1.25 GHz-3.00 GHz, 1.25 GHz-3.25 GHZ, 1.25 GHz-3.50 GHz, 1.25 GHz-3.75 GHz, 1.25 GHz-4.00 GHz, 1.25 GHz-4.25 GHZ, 1.25 GHz-4.50 GHz, 1.25 GHZ-4.75 GHz, 1.25 GHz-5.00 GHz, 1.50 GHz-1.75 GHz, 1.50 GHz-2.00 GHz, 1.50 GHz-2.25 GHz, 1.50 GHz-2.50 GHz, 1.50 GHz-2.75 GHZ, 1.50 GHz-3.00 GHZ, 1.50 GHz-3.25 GHZ, 1.50 GHz-3.50 GHz, 1.50 GHz-3.75 GHZ, 1.50 GHz-4.00 GHz, 1.50 GHz-4.25 GHZ, 1.50 GHz-4.50 GHz, 1.50 GHz-4.75 GHz, 1.50 GHz-5.00 GHz, 1.75 GHz-2.00 GHz, 1.75 GHZ-2.25 GHz, 1.75 GHZ-2.50 GHz, 1.75 GHz-2.75 GHZ, 1.75 GHZ-3.00 GHz, 1.75 GHz-3.25 GHz, 1.75 GHz-3.50 GHz, 1.75 GHZ-3.75 GHz, 1.75 GHz-4.00 GHz, 1.75 GHZ-4.25 GHz, 1.75 GHz-4.50 GHz, 1.75 GHz-4.75 GHz, 1.75 GHz-5.00 GHz, 2.00 GHz-2.25 GHz, 2.00 GHz-2.50 GHz, 2.00 GHz-2.75 GHz, 2.00 GHz-3.00 GHz, 2.00 GHz-3.25 GHz, 2.00 GHz-3.50 GHz, 2.00 GHz-3.75 GHz, 2.00 GHz-4.00 GHz, 2.00 GHz-4.25 GHz, 2.00 GHz-4.50 GHz, 2.00 GHz-4.75 GHZ, 2.00 GHz-5.00 GHz, 2.25 GHz-2.50 GHz, 2.25 GHz-2.75 GHz, 2.25 GHz-3.00 GHz, 2.25 GHz-3.25 GHZ, 2.25 GHz-3.50 GHz, 2.25 GHz-3.75 GHz, 2.25 GHz-4.00 GHz, 2.25 GHz-4.25 GHz, 2.25 GHz-4.50 GHz, 2.25 GHz-4.75 GHz, 2.25 GHz-5.00 GHz, 2.50 GHz-2.75 GHz, 2.50 GHz-3.00 GHz, 2.50 GHz-3.25 GHz, 2.50 GHz-3.50 GHz, 2.50 GHz-3.75 GHz, 2.50 GHz-4.00 GHz, 2.50 GHz-4.25 GHz, 2.50 GHz-4.50 GHz, 2.50 GHz-4.75 GHz, 2.50 GHz-5.00 GHz, 2.75 GHz-3.00 GHz, 2.75 GHz-3.25 GHz, 2.75 GHz-3.50 GHz, 2.75 GHz-3.75 GHz, 2.75 GHz-4.00 GHz, 2.75 GHz-4.25 GHz, 2.75 GHz-4.50 GHz, 2.75 GHz-4.75 GHz, 2.75 GHz-5.00 GHz, 3.00 GHz-3.25 GHz, 3.00 GHz-3.50 GHz, 3.00 GHz-3.75 GHz, 3.00 GHz-4.00 GHz, 3.00 GHz-4.25 GHz, 3.00 GHz-4.50 GHz, 3.00 GHz-4.75 GHz, 3.00 GHz-5.00 GHz, 3.25 GHz-3.50 GHz, 3.25 GHz-3.75 GHz, 3.25 GHz-4.00 GHz, 3.25 GHz- 4.25 GHz, 3.25 GHz-4.50 GHz, 3.25 GHz-4.75 GHz, 3.25 GHz-5.00 GHz, 3.50 GHz-3.75 GHz, 3.50 GHz-4.00 GHz, 3.50 GHz-4.25 GHz, 3.50 GHz-4.50 GHz, 3.50 GHz-4.75 GHz, 3.50 GHz-5.00 GHz, 3.75 GHz-4.00 GHz, 3.75 GHz-4.25 GHz, 3.75 GHz-4.50 GHz, 3.75 GHz-4.75 GHz, 3.75 GHz-5.00 GHz, 4.00 GHz-4.25 GHz, 4.00 GHz-4.50 GHz, 4.00 GHz-4.75 GHz, 4.00 GHz-5.00 GHz, 4.25 GHz-4.50 GHz, 4.25 GHz-4.75 GHz, 4.25 GHz-5.00 GHz, 4.50 GHz-4.75 GHz, 4.50 GHz-5.00 GHz, 4.75 GHz-5.00 GHz.

In embodiments, the personal processing terminal may include a display component such as a display screen (200). In embodiments, the display screen (200) is the screen of a phone (202). In embodiments, the display screen (200) is the screen of a laptop. In embodiments, the display screen (200) is the screen of a monitor (204). In embodiments, the display screen (200) is the screen of a TV. In embodiments, the display screen (200) is the screen of an Apple device. In embodiments, the display screen (200) is the screen of a Google or Android device. In embodiments, the display screen (200) may be 0.5 inches-105 inches in diagonal length, such as 0.5 in.-30 in., including 0.5 in.-1 in., 0.5 in.-2 in., 0.5 in.-3 in., 0.5 in.-4 in., 0.5 in.-5 in., 0.5 in.-6 in., 0.5 in.-7 in., 0.5 in.-8 in., 0.5 in.-9 in., 0.5 in.-10 in., 0.5 in.-11 in., 0.5 in.-12 in., 0.5 in.-13 in., 0.5 in.-14 in., 0.5 in.-15 in., 0.5 in.-16 in., 0.5 in.-17 in., 0.5 in.-18 in., 0.5 in.-19 in., 0.5 in.-20 in., 0.5 in.-21 in., 0.5 in.-22 in., 0.5 in.-23 in., 0.5 in.-24 in., 0.5 in.-25 in., 0.5 in.-26 in., 0.5 in.-27 in., 0.5 in.-28 in., 0.5 in.-29 in., 1 in.-2 in., 1 in.-3 in., 1 in.-4 in., 1 in.-5 in., 1 in.-6 in., 1 in.-7 in., 1 in.-8 in., 1 in.-9 in., 1 in.-10 in., 1 in.-11 in., 1 in.-12 in., 1 in.-13 in., 1 in.-14 in., 1 in.-15 in., 1 in.-16 in., 1 in.-17 in., 1 in.-18 in., 1 in.-19 in., 1 in.-20 in., 1 in.-21 in., 1 in.-22 in., 1 in.-23 in., 1 in.-24 in., 1 in.-25 in., 1 in.-26 in., 1 in.-27 in., 1 in.-28 in., 1 in.-29 in., 1 in.-30 in., 2 in.-3 in., 2 in.-4 in., 2 in.-5 in., 2 in.-6 in., 2 in.-7 in., 2 in.-8 in., 2 in.-9 in., 2 in.-10 in., 2 in.-11 in., 2 in.-12 in., 2 in.-13 in., 2 in.-14 in., 2 in.-15 in., 2 in.-16 in., 2 in.-17 in., 2 in.-18 in., 2 in.-19 in., 2 in.-20 in., 2 in.-21 in., 2 in.-22 in., 2 in.-23 in., 2 in.-24 in., 2 in.-25 in., 2 in.-26 in., 2 in.-27 in., 2 in.-28 in., 2 in.-29 in., 2 in.-30 in., 3 in.-4 in., 3 in.-5 in., 3 in.-6 in., 3 in.-7 in., 3 in.-8 in., 3 in.-9 in., 3 in.-10 in., 3 in.-11 in., 3 in.-12 in., 3 in.-13 in., 3 in.-14 in., 3 in.-15 in., 3 in.-16 in., 3 in.-17 in., 3 in.-18 in., 3 in.-19 in., 3 in.-20 in., 3 in.-21 in., 3 in.-22 in., 3 in.-23 in., 3 in.-24 in., 3 in.-25 in., 3 in.-26 in., 3 in.-27 in., 3 in.-28 in., 3 in.-29 in., 3 in.-30 in., 4 in.-5 in., 4 in.-6 in., 4 in.-7 in., 4 in.-8 in., 4 in.-9 in., 4 in.-10 in., 4 in.-11 in., 4 in.-12 in., 4 in.-13 in., 4 in.-14 in., 4 in.-15 in., 4 in.-16 in., 4 in.-17 in., 4 in.-18 in., 4 in.-19 in., 4 in.-20 in., 4 in.-21 in., 4 in.-22 in., 4 in.-23 in., 4 in.-24 in., 4 in.-25 in., 4 in.-26 in., 4 in.-27 in., 4 in.-28 in., 4 in.-29 in., 4 in.-30 in., 5 in.-6 in., 5 in.-7 in., 5 in.-8 in., 5 in.-9 in., 5 in.-10 in., 5 in.-11 in., 5 in.-12 in., 5 in.-13 in., 5 in.-14 in., 5 in.-15 in., 5 in.-16 in., 5 in.-17 in., 5 in.-18 in., 5 in.-19 in., 5 in.-20 in., 5 in.-21 in., 5 in.-22 in., 5 in.-23 in., 5 in.-24 in., 5 in.-25 in., 5 in.-26 in., 5 in.-27 in., 5 in.-28 in., 5 in.-29 in., 5 in.-30 in., 6 in.-7 in., 6 in.-8 in., 6 in.-9 in., 6 in.-10 in., 6 in.-11 in., 6 in.-12 in., 6 in.-13 in., 6 in.-14 in., 6 in.-15 in., 6 in.-16 in., 6 in.-17 in., 6 in.-18 in., 6 in.-19 in., 6 in.-20 in., 6 in.-21 in., 6 in.-22 in., 6 in.-23 in., 6 in.-24 in., 6 in.-25 in., 6 in.-26 in., 6 in.-27 in., 6 in.-28 in., 6 in.-29 in., 6 in.-30 in., 7 in.-8 in., 7 in.-9 in., 7 in.-10 in., 7 in.-11 in., 7 in.-12 in., 7 in.-13 in., 7 in.-14 in., 7 in.-15 in., 7 in.-16 in., 7 in.-17 in., 7 in.-18 in., 7 in.-19 in., 7 in.-20 in., 7 in.-21 in., 7 in.-22 in., 7 in.-23 in., 7 in.-24 in., 7 in.-25 in., 7 in.-26 in., 7 in.-27 in., 7 in.-28 in., 7 in.-29 in., 7 in.-30 in., 8 in.-9 in., 8 in.-10 in., 8 in.-11 in., 8 in.-12 in., 8 in.-13 in., 8 in.-14 in., 8 in.-15 in., 8 in.-16 in., 8 in.-17 in., 8 in.-18 in., 8 in.-19 in., 8 in.-20 in., 8 in.-21 in., 8 in.-22 in., 8 in.-23 in., 8 in.-24 in., 8 in.-25 in., 8 in.-26 in., 8 in.-27 in., 8 in.-28 in., 8 in.-29 in., 8 in.-30 in., 9 in.-10 in., 9 in.-11 in., 9 in.-12 in., 9 in.-13 in., 9 in.-14 in., 9 in.-15 in., 9 in.-16 in., 9 in.-17 in., 9 in.-18 in., 9 in.-19 in., 9 in.-20 in., 9 in.-21 in., 9 in.-22 in., 9 in.-23 in., 9 in.-24 in., 9 in.-25 in., 9 in.-26 in., 9 in.-27 in., 9 in.-28 in., 9 in.-29 in., 9 in.-30 in., 10 in.-11 in., 10 in.-12 in., 10 in.-13 in., 10 in.-14 in., 10 in.-15 in., 10 in.-16 in., 10 in.-17 in., 10 in.-18 in., 10 in.-19 in., 10 in.-20 in., 10 in.-21 in., 10 in.-22 in., 10 in.-23 in., 10 in.-24 in., 10 in.-25 in., 10 in.-26 in., 10 in.-27 in., 10 in.-28 in., 10 in.-29 in., 10 in.-30 in., 11 in.-12 in., 11 in.-13 in., 11 in.-14 in., 11 in.-15 in., 11 in.-16 in., 11 in.-17 in., 11 in.-18 in., 11 in.-19 in., 11 in.-20 in., 11 in.-21 in., 11 in.-22 in., 11 in.-23 in., 11 in.-24 in., 11 in.-25 in., 11 in.-26 in., 11 in.-27 in., 11 in.-28 in., 11 in.-29 in., 11 in.-30 in., 12 in.-13 in., 12 in.-14 in., 12 in.-15 in., 12 in.-16 in., 12 in.-17 in., 12 in.-18 in., 12 in.-19 in., 12 in.-20 in., 12 in.-21 in., 12 in.-22 in., 12 in.-23 in., 12 in.-24 in., 12 in.-25 in., 12 in.-26 in., 12 in.-27 in., 12 in.-28 in., 12 in.-29 in., 12 in.-30 in., 13 in.-14 in., 13 in.-15 in., 13 in.-16 in., 13 in.-17 in., 13 in.-18 in., 13 in.-19 in., 13 in.-20 in., 13 in.-21 in., 13 in.-22 in., 13 in.-23 in., 13 in.-24 in., 13 in.-25 in., 13 in.-26 in., 13 in.-27 in., 13 in.-28 in., 13 in.-29 in., 13 in.-30 in., 14 in.-15 in., 14 in.-16 in., 14 in.-17 in., 14 in.-18 in., 14 in.-19 in., 14 in.-20 in., 14 in.-21 in., 14 in.-22 in., 14 in.-23 in., 14 in.-24 in., 14 in.-25 in., 14 in.-26 in., 14 in.-27 in., 14 in.-28 in., 14 in.-29 in., 14 in.-30 in., 15 in.-16 in., 15 in.-17 in., 15 in.-18 in., 15 in.-19 in., 15 in.-20 in., 15 in.-21 in., 15 in.-22 in., 15 in.-23 in., 15 in.-24 in., 15 in.-25 in., 15 in.-26 in., 15 in.-27 in., 15 in.-28 in., 15 in.-29 in., 15 in.-30 in., 16 in.-17 in., 16 in.-18 in., 16 in.-19 in., 16 in.-20 in., 16 in.-21 in., 16 in.-22 in., 16 in.-23 in., 16 in.-24 in., 16 in.-25 in., 16 in.-26 in., 16 in.-27 in., 16 in.-28 in., 16 in.-29 in., 16 in.-30 in., 17 in.-18 in., 17 in.-19 in., 17 in.-20 in., 17 in.-21 in., 17 in.-22 in., 17 in.-23 in., 17 in.-24 in., 17 in.-25 in., 17 in.-26 in., 17 in.-27 in., 17 in.-28 in., 17 in.-29 in., 17 in.-30 in., 18 in.-19 in., 18 in.-20 in., 18 in.-21 in., 18 in.-22 in., 18 in.-23 in., 18 in.-24 in., 18 in.-25 in., 18 in.-26 in., 18 in.-27 in., 18 in.-28 in., 18 in.-29 in., 18 in.-30 in., 19 in.-20 in., 19 in.-21 in., 19 in.-22 in., 19 in.-23 in., 19 in.-24 in., 19 in.-25 in., 19 in.-26 in., 19 in.-27 in., 19 in.-28 in., 19 in.-29 in., 19 in.-30 in., 20 in.-21 in., 20 in.-22 in., 20 in.-23 in., 20 in.-24 in., 20 in.-25 in., 20 in.-26 in., 20 in.-27 in., 20 in.-28 in., 20 in.-29 in., 20 in.-30 in., 21 in.-22 in., 21 in.-23 in., 21 in.-24 in., 21 in.-25 in., 21 in.-26 in., 21 in.-27 in., 21 in.-28 in., 21 in.-29 in., 21 in.-30 in., 22 in.-23 in., 22 in.-24 in., 22 in.-25 in., 22 in.-26 in., 22 in.-27 in., 22 in.-28 in., 22 in.-29 in., 22 in.-30 in., 23 in.-24 in., 23 in.-25 in., 23 in.-26 in., 23 in.-27 in., 23 in.-28 in., 23 in.-29 in., 23 in.-30 in., 24 in.-25 in., 24 in.-26 in., 24 in.-27 in., 24 in.-28 in., 24 in.-29 in., 24 in.-30 in., 25 in.-26 in., 25 in.-27 in., 25 in.-28 in., 25 in.-29 in., 25 in.-30 in., 26 in.-27 in., 26 in.-28 in., 26 in.-29 in., 26 in.-30 in., 27 in.-28 in., 27 in.-29 in., 27 in.-30 in., 28 in.-29 in., 28 in.-30 in., 29 in.-30 in.

In embodiments, the personal processing terminal may include a RAM unit. The RAM unit is the collection of RAM sticks in the personal processing terminal. The RAM unit may provide the personal processing terminal a RAM-unit memory of between 200 MB and 2 TB, such as 0.5 GB-65 GB, including 0.5 GB-2.5 GB, 0.5 GB-5.0 GB, 0.5 GB-7.5 GB, 0.5 GB-10.0 GB, 0.5 GB-12.5 GB, 0.5 GB-15.0 GB, 0.5 GB-17.5 GB, 0.5 GB-20.0 GB, 0.5 GB-22.5 GB, 0.5 GB-25.0 GB, 0.5 GB-27.5 GB, 0.5 GB-30.0 GB, 0.5 GB-32.5 GB, 0.5 GB-35.0 GB, 0.5 GB-37.5 GB, 0.5 GB-40.0 GB, 0.5 GB-42.5 GB, 0.5 GB-45.0 GB, 0.5 GB-47.5 GB, 0.5 GB-50.0 GB, 0.5 GB-52.5 GB, 0.5 GB-55.0 GB, 0.5 GB-57.5 GB, 0.5 GB-60.0 GB, 0.5 GB-62.5 GB, 2.5 GB-5.0 GB, 2.5 GB-7.5 GB, 2.5 GB-10.0 GB, 2.5 GB-12.5 GB, 2.5 GB-15.0 GB, 2.5 GB-17.5 GB, 2.5

GB-20.0 GB, 2.5 GB-22.5 GB, 2.5 GB-25.0 GB, 2.5 GB-27.5 GB, 2.5 GB-30.0 GB, 2.5 GB-32.5 GB, 2.5 GB-35.0 GB, 2.5 GB-37.5 GB, 2.5 GB-40.0 GB, 2.5 GB-42.5 GB, 2.5 GB-45.0 GB, 2.5 GB-47.5 GB, 2.5 GB-50.0 GB, 2.5 GB-52.5 GB, 2.5 GB-55.0 GB, 2.5 GB-57.5 GB, 2.5 GB-60.0 GB, 2.5 GB-62.5 GB, 2.5 GB-65.0 GB, 5.0 GB-7.5 GB, 5.0 GB-10.0 GB, 5.0 GB-12.5 GB, 5.0 GB-15.0 GB, 5.0 GB-17.5 GB, 5.0 GB-20.0 GB, 5.0 GB-22.5 GB, 5.0 GB-25.0 GB, 5.0 GB-27.5 GB, 5.0 GB-30.0 GB, 5.0 GB-32.5 GB, 5.0 GB-35.0 GB, 5.0 GB-37.5 GB, 5.0 GB-40.0 GB, 5.0 GB-42.5 GB, 5.0 GB-45.0 GB, 5.0 GB-47.5 GB, 5.0 GB-50.0 GB, 5.0 GB-52.5 GB, 5.0 GB-55.0 GB, 5.0 GB-57.5 GB, 5.0 GB-60.0 GB, 5.0 GB-62.5 GB, 5.0 GB-65.0 GB, 7.5 GB-10.0 GB, 7.5 GB-12.5 GB, 7.5 GB-15.0 GB, 7.5 GB-17.5 GB, 7.5 GB-20.0 GB, 7.5 GB-22.5 GB, 7.5 GB-25.0 GB, 7.5 GB-27.5 GB, 7.5 GB-30.0 GB, 7.5 GB-32.5 GB, 7.5 GB-35.0 GB, 7.5 GB-37.5 GB, 7.5 GB-40.0 GB, 7.5 GB-42.5 GB, 7.5 GB-45.0 GB, 7.5 GB-47.5 GB, 7.5 GB-50.0 GB, 7.5 GB-52.5 GB, 7.5 GB-55.0 GB, 7.5 GB-57.5 GB, 7.5 GB-60.0 GB, 7.5 GB-62.5 GB, 7.5 GB-65.0 GB, 10.0 GB-12.5 GB, 10.0 GB-15.0 GB, 10.0 GB-17.5 GB, 10.0 GB-20.0 GB, 10.0 GB-22.5 GB, 10.0 GB-25.0 GB, 10.0 GB-27.5 GB, 10.0 GB-30.0 GB, 10.0 GB-32.5 GB, 10.0 GB-35.0 GB, 10.0 GB-37.5 GB, 10.0 GB-40.0 GB, 10.0 GB-42.5 GB, 10.0 GB-45.0 GB, 10.0 GB-47.5 GB, 10.0 GB-50.0 GB, 10.0 GB-52.5 GB, 10.0 GB-55.0 GB, 10.0 GB-57.5 GB, 10.0 GB-60.0 GB, 10.0 GB-62.5 GB, 10.0 GB-65.0 GB, 12.5 GB-15.0 GB, 12.5 GB-17.5 GB, 12.5 GB-20.0 GB, 12.5 GB-22.5 GB, 12.5 GB-25.0 GB, 12.5 GB-27.5 GB, 12.5 GB-30.0 GB, 12.5 GB-32.5 GB, 12.5 GB-35.0 GB, 12.5 GB-37.5 GB, 12.5 GB-40.0 GB, 12.5 GB-42.5 GB, 12.5 GB-45.0 GB, 12.5 GB-47.5 GB, 12.5 GB-50.0 GB, 12.5 GB-52.5 GB, 12.5 GB-55.0 GB, 12.5 GB-57.5 GB, 12.5 GB-60.0 GB, 12.5 GB-62.5 GB, 12.5 GB-65.0 GB, 15.0 GB-17.5 GB, 15.0 GB-20.0 GB, 15.0 GB-22.5 GB, 15.0 GB-25.0 GB, 15.0 GB-27.5 GB, 15.0 GB-30.0 GB, 15.0 GB-32.5 GB, 15.0 GB-35.0 GB, 15.0 GB-37.5 GB, 15.0 GB-40.0 GB, 15.0 GB-42.5 GB, 15.0 GB-45.0 GB, 15.0 GB-47.5 GB, 15.0 GB-50.0 GB, 15.0 GB-52.5 GB, 15.0 GB-55.0 GB, 15.0 GB-57.5 GB, 15.0 GB-60.0 GB, 15.0 GB-62.5 GB, 15.0 GB-65.0 GB, 17.5 GB-20.0 GB, 17.5 GB-22.5 GB, 17.5 GB-25.0 GB, 17.5 GB-27.5 GB, 17.5 GB-30.0 GB, 17.5 GB-32.5 GB, 17.5 GB-35.0 GB, 17.5 GB-37.5 GB, 17.5 GB-40.0 GB, 17.5 GB-42.5 GB, 17.5 GB-45.0 GB, 17.5 GB-47.5 GB, 17.5 GB-50.0 GB, 17.5 GB-52.5 GB, 17.5 GB-55.0 GB, 17.5 GB-57.5 GB, 17.5 GB-60.0 GB, 17.5 GB-62.5 GB, 17.5 GB-65.0 GB, 20.0 GB-22.5 GB, 20.0 GB-25.0 GB, 20.0 GB-27.5 GB, 20.0 GB-30.0 GB, 20.0 GB-32.5 GB, 20.0 GB-35.0 GB, 20.0 GB-37.5 GB, 20.0 GB-40.0 GB, 20.0 GB-42.5 GB, 20.0 GB-45.0 GB, 20.0 GB-47.5 GB, 20.0 GB-50.0 GB, 20.0 GB-52.5 GB, 20.0 GB-55.0 GB, 20.0 GB-57.5 GB, 20.0 GB-60.0 GB, 20.0 GB-62.5 GB, 20.0 GB-65.0 GB, 22.5 GB-25.0 GB, 22.5 GB-27.5 GB, 22.5 GB-30.0 GB, 22.5 GB-32.5 GB, 22.5 GB-35.0 GB, 22.5 GB-37.5 GB, 22.5 GB-40.0 GB, 22.5 GB-42.5 GB, 22.5 GB-45.0 GB, 22.5 GB-47.5 GB, 22.5 GB-50.0 GB, 22.5 GB-52.5 GB, 22.5 GB-55.0 GB, 22.5 GB-57.5 GB, 22.5 GB-60.0 GB, 22.5 GB-62.5 GB, 22.5 GB-65.0 GB, 25.0 GB-27.5 GB, 25.0 GB-30.0 GB, 25.0 GB-32.5 GB, 25.0 GB-35.0 GB, 25.0 GB-37.5 GB, 25.0 GB-40.0 GB, 25.0 GB-42.5 GB, 25.0 GB-45.0 GB, 25.0 GB-47.5 GB, 25.0 GB-50.0 GB, 25.0 GB-52.5 GB, 25.0 GB-55.0 GB, 25.0 GB-57.5 GB, 25.0 GB-60.0 GB, 25.0 GB-62.5 GB, 25.0 GB-65.0 GB, 27.5 GB-30.0 GB, 27.5 GB-32.5 GB, 27.5 GB-35.0 GB, 27.5 GB-37.5 GB, 27.5 GB-40.0 GB, 27.5 GB-42.5 GB, 27.5 GB-45.0 GB, 27.5 GB-47.5 GB, 27.5 GB-50.0 GB, 27.5 GB-52.5 GB, 27.5 GB-55.0 GB, 27.5 GB-57.5 GB, 27.5 GB-60.0 GB, 27.5 GB-62.5 GB, 27.5 GB-65.0 GB, 30.0 GB-32.5 GB, 30.0 GB-35.0 GB, 30.0 GB-37.5 GB, 30.0 GB-40.0 GB, 30.0 GB-42.5 GB, 30.0 GB-45.0 GB, 30.0 GB-47.5 GB, 30.0 GB-50.0 GB, 30.0 GB-52.5 GB, 30.0 GB-55.0 GB, 30.0 GB-57.5 GB, 30.0 GB-60.0 GB, 30.0 GB-62.5 GB, 30.0 GB-65.0 GB, 32.5 GB-35.0 GB, 32.5 GB-37.5 GB, 32.5 GB-40.0 GB, 32.5 GB-42.5 GB, 32.5 GB-45.0 GB, 32.5 GB-47.5 GB, 32.5 GB-50.0 GB, 32.5 GB-52.5 GB, 32.5 GB-55.0 GB, 32.5 GB-57.5 GB, 32.5 GB-60.0 GB, 32.5 GB-62.5 GB, 32.5 GB-65.0 GB, 35.0 GB-37.5 GB, 35.0 GB-40.0 GB, 35.0 GB-42.5 GB, 35.0 GB-45.0 GB, 35.0 GB-47.5 GB, 35.0 GB-50.0 GB, 35.0 GB-52.5 GB, 35.0 GB-55.0 GB, 35.0 GB-57.5 GB, 35.0 GB-60.0 GB, 35.0 GB-62.5 GB, 35.0 GB-65.0 GB, 37.5 GB-40.0 GB, 37.5 GB-42.5 GB, 37.5 GB-45.0 GB, 37.5 GB-47.5 GB, 37.5 GB-50.0 GB, 37.5 GB-52.5 GB, 37.5 GB-55.0 GB, 37.5 GB-57.5 GB, 37.5 GB-60.0 GB, 37.5 GB-62.5 GB, 37.5 GB-65.0 GB, 40.0 GB-42.5 GB, 40.0 GB-45.0 GB, 40.0 GB-47.5 GB, 40.0 GB-50.0 GB, 40.0 GB-52.5 GB, 40.0 GB-55.0 GB, 40.0 GB-57.5 GB, 40.0 GB-60.0 GB, 40.0 GB-62.5 GB, 40.0 GB-65.0 GB, 42.5 GB-45.0 GB, 42.5 GB-47.5 GB, 42.5 GB-50.0 GB, 42.5 GB-52.5 GB, 42.5 GB-55.0 GB, 42.5 GB-57.5 GB, 42.5 GB-60.0 GB, 42.5 GB-62.5 GB, 42.5 GB-65.0 GB, 45.0 GB-47.5 GB, 45.0 GB-50.0 GB, 45.0 GB-52.5 GB, 45.0 GB-55.0 GB, 45.0 GB-57.5 GB, 45.0 GB-60.0 GB, 45.0 GB-62.5 GB, 45.0 GB-65.0 GB, 47.5 GB-50.0 GB, 47.5 GB-52.5 GB, 47.5 GB-55.0 GB, 47.5 GB-57.5 GB, 47.5 GB-60.0 GB, 47.5 GB-62.5 GB, 47.5 GB-65.0 GB, 50.0 GB-52.5 GB, 50.0 GB-55.0 GB, 50.0 GB-57.5 GB, 50.0 GB-60.0 GB, 50.0 GB-62.5 GB, 50.0 GB-65.0 GB, 52.5 GB-55.0 GB, 52.5 GB-57.5 GB, 52.5 GB-60.0 GB, 52.5 GB-62.5 GB, 52.5 GB-65.0 GB, 55.0 GB-57.5 GB, 55.0 GB-60.0 GB, 55.0 GB-62.5 GB, 55.0 GB-65.0 GB, 57.5 GB-60.0 GB, 57.5 GB-62.5 GB, 57.5 GB-65.0 GB, 60.0 GB-62.5 GB, 60.0 GB-65.0 GB, 62.5 GB-65.0 GB.

Limiting performance specifications of a personal processing terminal may limit the ability of a user to run programs that may cause issues in the application server (100), such as running programs that try to hack or interfere with processes of the application server (100).

In embodiments, a network (106) connects one digital device to one or more of other digital devices. In some embodiments, networks (106) may be wireless. In other embodiments, networks (106) may be wired. In other embodiments, networks (106) may have a combination of wireless and wired aspects. In embodiments, the network (106) may be a public network (106). In embodiments, the network (106) may be a private network (106). One example of a wireless network (106) is a mobile network (106). Another example of a wireless network (106) is the Internet or the World Wide Web. In embodiments, a plurality of user terminals (102) may be connected over a network (106).

In embodiments, user terminals (102A) may provide blocks over the network (106). Blocks carry some information from one device to the network (106) or to one or more other devices. In embodiments, blocks may contain information in the form of data. In embodiments, blocks may contain information in the form of media. In embodiments, blocks may contain information in the form of digital strings. In embodiments, blocks may contain information in the form of any file type. In embodiments, blocks may contain information in other forms. A block sent by a user terminal (102A) or by plurality of user terminals (102) are user-information blocks. In embodiments, user-information blocks may contain any kind of digital information. In embodiments, user terminals (102A) may provide user-information blocks to a network (106). In embodiments, user terminals (102A) may provide user-information blocks directly to other digital devices.

Selection data is digital data that represents a selection of a user-information block. In embodiments, user terminals (102A) may provide selection data to a network (106). In embodiments, user terminals (102A) may provide selection data directly to other digital devices.

In embodiments, one or more user-information blocks may be sent to a network (106) by physically pressing one or more buttons on a mouse (208) and/or keyboard (206) of a user terminal (102A) to direct the one or more user-information blocks to the network (106). In embodiments, selection data may be sent to a network (106) by physically pressing one or more buttons on a mouse (208) and/or keyboard (206) of the user terminal (102A) to direct the selection data to the network (106).

In embodiments, an application server (100) may exist to allow each user-terminal to operate as a part of a system. In embodiments, the application server (100) may be one more devices, such as one or more server computers running software corresponding to application creation and/or management, that create an application (300). In embodiments, the application server (100) may utilize a network (106) to connect multiple digital devices to create a system of democratically selecting a user-terminal and/or a wallet of a user to which payment is to be sent.

In embodiments, an application server (100) may be connected to the network (106) via one or more server computers or server-running digital devices of the application (300). In embodiments, the application server (100) may receive user-information blocks after the user-information blocks have traveled through a network (106) from user terminals (102A). In embodiments, an application server (100) may be receiving selection data. In embodiments, the application server (100) is configured to utilize, manipulate, and/or operate upon user-information blocks and/or selection data.

In some embodiments, the application server (100) provides user information blocks to a content handler (110). In embodiments, the content handler (110) is a part of the application server (100). In other embodiments, the content handler (110) is external to the application server, such as the content handler (110) being part of an external source. In embodiments, the content handler (110) receives at least some user-information blocks accepted from the application server (100) which received said some user-information blocks and/or selection data from the network (106). In other embodiments, the content handler (110) receives at least some user information-blocks and/or selection data that are sent to the application server (106). In other embodiments, the content handler (110) receives all user-information blocks that are sent to the application server (100). In other embodiments, the content handler (110) receives only 0.001%-99.999% of user information blocks, such as 0.001%-5%, 0.001%-10%, 0.001%-15%, 0.001%-20%, 0.001%-25%, 0.001%-30%, 0.001%-35%, 0.001%-40%, 0.001%-45%, 0.001%-50%, 0.001%-55%, 0.001%-60%, 0.001%-65%, 0.001%-70%, 0.001%-75%, 0.001%-80%, 0.001%-85%, 0.001%-90%, 0.001%-95%, 5%-10%, 5%-15%, 5%-20%, 5%-25%, 5%-30%, 5%-35%, 5%-40%, 5%-45%, 5%-50%, 5%-55%, 5%-60%, 5%-65%, 5%-70%, 5%-75%, 5%-80%, 5%-85%, 5%-90%, 5%-95%, 5%-99.999%, 10%-15%, 10%-20%, 10%-25%, 10%-30%, 10%-35%, 10%-40%, 10%-45%, 10%-50%, 10%-55%, 10%-60%, 10%-65%, 10%-70%, 10%-75%, 10%-80%, 10%-85%, 10%-90%, 10%-95%, 10%-99.999%, 15%-20%, 15%-25%, 15%-30%, 15%-35%, 15%-40%, 15%-45%, 15%-50%, 15%-55%, 15%-60%, 15%-65%, 15%-70%, 15%-75%, 15%-80%, 15%-85%, 15%-90%, 15%-95%, 15%-99.999%, 20%-25%, 20%-30%, 20%-35%, 20%-40%, 20%-45%, 20%-50%, 20%-55%, 20%-60%, 20%-65%, 20%-70%, 20%-75%, 20%-80%, 20%-85%, 20%-90%, 20%-95%, 20%-99.999%, 25%-30%, 25%-35%, 25%-40%, 25%-45%, 25%-50%, 25%-55%, 25%-60%, 25%-65%, 25%-70%, 25%-75%, 25%-80%, 25%-85%, 25%-90%, 25%-95%, 25%-99.999%, 30%-35%, 30%-40%, 30%-45%, 30%-50%, 30%-55%, 30%-60%, 30%-65%, 30%-70%, 30%-75%, 30%-80%, 30%-85%, 30%-90%, 30%-95%, 30%-99.999%, 35%-40%, 35%-45%, 35%-50%, 35%-55%, 35%-60%, 35%-65%, 35%-70%, 35%-75%, 35%-80%, 35%-85%, 35%-90%, 35%-95%, 35%-99.999%, 40%-45%, 40%-50%, 40%-55%, 40%-60%, 40%-65%, 40%-70%, 40%-75%, 40%-80%, 40%-85%, 40%-90%, 40%-95%, 40%-99.999%, 45%-50%, 45%-55%, 45%-60%, 45%-65%, 45%-70%, 45%-75%, 45%-80%, 45%-85%, 45%-90%, 45%-95%, 45%-99.999%, 50%-55%, 50%-60%, 50%-65%, 50%-70%, 50%-75%, 50%-80%, 50%-85%, 50%-90%, 50%-95%, 50%-99.999%, 55%-60%, 55%-65%, 55%-70%, 55%-75%, 55%-80%, 55%-85%, 55%-90%, 55%-95%, 55%-99.999%, 60%-65%, 60%-70%, 60%-75%, 60%-80%, 60%-85%, 60%-90%, 60%-95%, 60%-99.999%, 65%-70%, 65%-75%, 65%-80%, 65%-85%, 65%-90%, 65%-95%, 65%-99.999%, 70%-75%, 70%-80%, 70%-85%, 70%-90%, 70%-95%, 70%-99.999%, 75%-80%, 75%-85%, 75%-90%, 75%-95%, 75%-99.999%, 80%-85%, 80%-90%, 80%-95%, 80%-99.999%, 85%-90%, 85%-95%, 85%-99.999%, 90%-95%, 90%-99.999%, 95%-99.999%.

In embodiments, as shown in FIGS. 1 and 2, the content handler (110) includes a display medium (110A) (otherwise referred to as "DM") and a quantifying unit (110B) (otherwise referred to as "QU"). In embodiments, the display medium (110A) provides content for display, the content displayed by a display component. In embodiments, a display medium (110A) may be the software or portion of software providing a visual organization of content that has been sent to the application server (100). Said content may include digital or electronic text, digital or electronic characters, digital or electronic symbols, document files, photo files, digital or electronic photos, video files, digital or electronic videos, audio files, digital or electronic audio, audiovisual files, program files, application files, and any compilations and/or combinations thereof. In some embodiments, a display medium (110A) may be software or a portion of software providing an arrangement of pixels. In embodiments, a display medium (110A) may be a website (304), wherein the application is run as a web app. In embodiments, a display medium (110A) may be a page or a compilation of pages of a website (304). In embodiments, a display medium (110A) may be the graphical interface (302) (otherwise referred to as "graphical user interface" or "GUI" or "GI") of an application (300). In embodiments, a display medium (110A) may be graphical interface (302) of software. In embodiments, a display medium (110A) may be graphical interface (302) of a program. In embodiments, a display medium (110A) may be graphical interface (302) of videogame software. In embodiments, the display component may be the screen of a device. In embodiments, the display component may be the screen of a VR headset. In embodiments, the display component may be multiple screens corresponding to a device. In embodiments, the display component may be both the screen of a VR headset and one or more monitors and/or TVs of a device.

In embodiments, the content handler (110) may further include a quantifying unit (110B). The quantifying unit (110B) is a device, or a collection of devices, or may be software on a device, or on a collection of devices, that is capable of tabulating, recording, and/or storing selection data. In embodiments, the quantifying unit (110B) may tabulate or count selection data sent from a specific user terminal (102A), and the result of the counting/tabulation may be sent back to the application server (100) or sent directly to a client terminal (104). Further, in embodiments, the quantifying unit (110B) may tabulate or count selection data corresponding to a user-information block, and the result of the counting/tabulation may be sent back to the application server (100) or sent directly to a client terminal (104). In other embodiments, the quantifying unit (110B) may more specifically tabulate/count selection data sent from a client terminal (104) and corresponding to a user-information block or set of user-information blocks, and the result of the counting/tabulation may be sent back to the application server (100) or sent directly to a client terminal (104). As an example, user terminal 1 may send user-information block 1, and user terminals 2, 3, and 4 may send selection data corresponding to user terminal 1. The quantifying unit may count the selection data of user terminals 2, 3, and 4 for user-information block 1, and the quantifying unit may record three tabulations for user-information block 1. The quantifying unit may thereafter store the information of three tabulations and/or the quantifying unit may send a block, to the application server and/or client terminal, conveying information that user-information block 1 has three tabulations.

In other embodiments, negative-selection data may exist, whereby a user terminal (102A) may send negative-selection data into the network (106), such that negative-selection data is received by the application server (100) and thereafter sent to the content handler (110) or such that the negative-selection data is received by the content handler (110) directly from the network (106). The quantifying unit (110B) may remove a count or a tabulation from a collective tabulation (such as a comparative value) corresponding to a user-information string upon the receipt of negative-selection data.

In embodiments, the quantifying unit (110B) and/or the display medium (110A) may receive user-information and/or selection data directly from the network (106) rather than having another device intercept the user-information and/or selection data first to thereafter convey the user-information and/or selection data to the quantifying unit (110B) and/or the display medium (110A). In preferred embodiments, the quantifying unit (110B) and/or the display medium (110A) receive user-information and/or selection data indirectly from the network (106).

In other embodiments, the content handler (110) is split up into two devices or software on two different devices, such that there is a quantifying content handler and a display content handler. A quantifying content handler may be a content handler interacting with the application server (100) primarily to perform tabulation functions. A display content handler may be a content handler interacting with the application server (100) primarily to perform display-organization functions.

A value that the quantifying unit (110B) provides to the display medium (110A) corresponding to the number of counts or tabulations corresponding to a user-information block is a comparing value.

A value that the quantifying unit (110B) sends to the application server (100) or client terminal (104) is a final comparing value, and a final comparing value represents the number of counts or tabulations corresponding to a user-information block (or set of user-information blocks) sent by a user terminal (102A) (or a set of user terminals) at any given time of sending the final comparing value. In embodiments, the final comparing value may operate to compare user-information blocks to determine which user-information blocks receive the most tabulations or the highest tabulations.

In embodiments, the highest tabulated user-information block may not be the most tabulated user information block when the act of counting by the quantifying unit includes negative-selection data.

In embodiments, the final comparing value may be updated and changed as time passes. In embodiments, the final comparing value may be updated periodically. In embodiments, the final comparing value may be updated continuously. In embodiments, the final comparing value may not be updated once establishment of the final comparing value is achieved, wherein establishment of a final comparing value may be achieved by ending counting for a user-information string or sending a user-information string and its comparing value to a client terminal.

In embodiments, a server computer of the application server receives user-information blocks and/or selection data from the network, and the server computer thereafter sends the user-information blocks and/or the selection data in the network to another device that is part of the application server and that functions as the content handler and/or runs software to perform content-handler functions.

In some embodiments, a receiving terminal is a terminal of the application server that receives the user-information blocks and/or selection data from the network, and the receiving terminal may also run the software comprising the content handler. In further embodiments, sending user-information blocks and/or selection data from a receiving terminal to the content handler includes moving the user-information blocks and/or selection data from a receipt destination of the receiving terminal to the software of the content handler on the receiving terminal.

In other embodiments, the content handler is software run on a client terminal.

In other embodiments, sending user-information blocks and/or selection data from a receiving terminal to the content handler includes sending selection data from a receiving terminal to another terminal inside or outside the application server, the another terminal running software for the content handler.

In embodiments, a client may utilize a client terminal (104), which is any physical device that interacts with the application server (100) over a network (106) and has client-identifying information of the client and is used for at least one client purpose disclosed herein, wherein said digital device can communicate over the network (106). Examples of a client terminal (104) may be a phone (202) accessing the application server (100) with client-identifying information of the client, a computer (including, but not limited to, desktops and laptops) accessing the application server (100) with client-identifying information of the client, a server computer accessing the application server (100) with client-identifying information of the client, an Apple device accessing the application server (100) with client-identifying information of the client and capable of accessing the network (106), an Android device accessing the application server (100) with client-identifying information of the client and capable of accessing the network (106), a gaming device (such as a Nintendo, Switch, PlayStation, Xbox, etc.) with client-identifying information of the client and capable of accessing the network (106). A specific client terminal (104) is not identified by the specific device used but, rather, a specific client terminal (104) is identified by a client accessing the application server (100) with client-identifying information of the client on a device. Hence, a specific client terminal (104) may exist on one device and then another device and still be considered the same specific client terminal (104), but at least some client-identifying information of the specific client terminal (104) must remain the same for the specific client terminal (104) to be considered the same specific client terminal (104). Client-identifying information is any information that distinguishes one client from another client. In embodiments, client-identifying information may be provided to a terminal (108) by physically pressing buttons of a mouse (208) and/or keyboard (206) to input client information into the terminal for the purposes of accessing the terminal as a client terminal (104).

In embodiments, a client terminal (104) may read one or more selected user-information blocks. Selected user information blocks are user-information blocks that the application server (100) or content handler (110) provides to the client terminal (104) for purposes of having the client terminal provide approval of one or more of the selected user-information blocks, such approval directly or indirectly triggering a payment. In embodiments, user-information blocks are filtered by a comparing value threshold or by a maximum number of the user-information blocks to be selected, and user-information blocks remaining after filtering become selected user-information blocks sent to the client terminal (104). In embodiments, a client terminal (104) may read one or more of a group of selected user-information blocks. In embodiments, group of selected user-information blocks may be tied together by a commonality, such as a common topic or a common theme.

In embodiments, a group of selected user-information blocks may include 2 selected user-information blocks, 3 selected user-information blocks, 4 selected user-information blocks, 5 selected user-information blocks, 6 selected user-information blocks, 7 selected user-information blocks, 8 selected user-information blocks, 9 selected user-information blocks, 10 selected user-information blocks, 11 selected user-information blocks, 12 selected user-information blocks, 13 selected user-information blocks, 14 selected user-information blocks, 15 selected user-information blocks, 16 selected user-information blocks, 17 selected user-information blocks, 18 selected user-information blocks, 19 selected user-information blocks, 20 selected user-information blocks.

In embodiments, a group of selected user-information blocks may include 2-100 user-information blocks, such as 2-4 user-information blocks, 2-6 user-information blocks, 2-8 user-information blocks, 2-10 user-information blocks, 2-12 user-information blocks, 2-14 user-information blocks, 2-16 user-information blocks, 2-18 user-information blocks, 2-20 user-information blocks, 2-22 user-information blocks, 2-24 user-information blocks, 2-26 user-information blocks, 2-28 user-information blocks, 2-30 user-information blocks, 2-32 user-information blocks, 2-34 user-information blocks, 2-36 user-information blocks, 2-38 user-information blocks, 2-40 user-information blocks, 2-42 user-information blocks, 2-44 user-information blocks, 2-46 user-information blocks, 2-48 user-information blocks, 2-50 user-information blocks, 2-52 user-information blocks, 2-54 user-information blocks, 2-56 user-information blocks, 2-58 user-information blocks, 2-60 user-information blocks, 2-62 user-information blocks, 2-64 user-information blocks, 2-66 user-information blocks, 2-68 user-information blocks, 2-70 user-information blocks, 2-72 user-information blocks, 2-74 user-information blocks, 2-76 user-information blocks, 2-78 user-information blocks, 2-80 user-information blocks, 2-82 user-information blocks, 2-84 user-information blocks, 2-86 user-information blocks, 2-88 user-information blocks, 2-90 user-information blocks, 2-92 user-information blocks, 2-94 user-information blocks, 2-96 user-information blocks, 2-98 user-information blocks, 4-6 user-information blocks, 4-8 user-information blocks, 4-10 user-information blocks, 4-12 user-information blocks, 4-14 user-information blocks, 4-16 user-information blocks, 4-18 user-information blocks, 4-20 user-information blocks, 4-22 user-information blocks, 4-24 user-information blocks, 4-26 user-information blocks, 4-28 user-information blocks, 4-30 user-information blocks, 4-32 user-information blocks, 4-34 user-information blocks, 4-36 user-information blocks, 4-38 user-information blocks, 4-40 user-information blocks, 4-42 user-information blocks, 4-44 user-information blocks, 4-46 user-information blocks, 4-48 user-information blocks, 4-50 user-information blocks, 4-52 user-information blocks, 4-54 user-information blocks, 4-56 user-information blocks, 4-58 user-information blocks, 4-60 user-information blocks, 4-62 user-information blocks, 4-64 user-information blocks, 4-66 user-information blocks, 4-68 user-information blocks, 4-70 user-information blocks, 4-72 user-information blocks, 4-74 user-information blocks, 4-76 user-information blocks, 4-78 user-information blocks, 4-80 user-information blocks, 4-82 user-information blocks, 4-84 user-information blocks, 4-86 user-information blocks, 4-88 user-information blocks, 4-90 user-information blocks, 4-92 user-information blocks, 4-94 user-information blocks, 4-96 user-information blocks, 4-98 user-information blocks, 4-100 user-information blocks, 6-8 user-information blocks, 6-10 user-information blocks, 6-12 user-information blocks, 6-14 user-information blocks, 6-16 user-information blocks, 6-18 user-information blocks, 6-20 user-information blocks, 6-22 user-information blocks, 6-24 user-information blocks, 6-26 user-information blocks, 6-28 user-information blocks, 6-30 user-information blocks, 6-32 user-information blocks, 6-34 user-information blocks, 6-36 user-information blocks, 6-38 user-information blocks, 6-40 user-information blocks, 6-42 user-information blocks, 6-44 user-information blocks, 6-46 user-information blocks, 6-48 user-information blocks, 6-50 user-information blocks, 6-52 user-information blocks, 6-54 user-information blocks, 6-56 user-information blocks, 6-58 user-information blocks, 6-60 user-information blocks, 6-62 user-information blocks, 6-64 user-information blocks, 6-66 user-information blocks, 6-68 user-information blocks, 6-70 user-information blocks, 6-72 user-information blocks, 6-74 user-information blocks, 6-76 user-information blocks, 6-78 user-information blocks, 6-80 user-information blocks, 6-82 user-information blocks, 6-84 user-information blocks, 6-86 user-information blocks, 6-88 user-information blocks, 6-90 user-information blocks, 6-92 user-information blocks, 6-94 user-information blocks, 6-96 user-information blocks, 6-98 user-information blocks, 6-100 user-information blocks, 8-10 user-information blocks, 8-12 user-information blocks, 8-14 user-information blocks, 8-16 user-information blocks, 8-18 user-information blocks, 8-20 user-information blocks, 8-22 user-information blocks, 8-24 user-information blocks, 8-26 user-information blocks, 8-28 user-information blocks, 8-30 user-information blocks, 8-32 user-information blocks, 8-34 user-information blocks, 8-36 user-information blocks, 8-38 user-information blocks, 8-40 user-information blocks, 8-42 user-information blocks, 8-44 user-information blocks, 8-46 user-information blocks, 8-48 user-information blocks, 8-50 user-information blocks, 8-52 user-information blocks, 8-54 user-information blocks, 8-56 user-information blocks, 8-58 user-information blocks, 8-60 user-information blocks, 8-62 user-information blocks, 8-64 user-information blocks, 8-66 user-information blocks, 8-68 user-information blocks, 8-70 user-information blocks, 8-72 user-information blocks, 8-74 user-information blocks, 8-76 user-information blocks, 8-78 user-information blocks, 8-80 user-information blocks, 8-82 user-information blocks, 8-84 user-information blocks, 8-86 user-information blocks, 8-88 user-information blocks, 8-90 user-information blocks, 8-92 user-information blocks, 8-94 user-information blocks, 8-96 user-information blocks, 8-98 user-information blocks, 8-100 user-information blocks, 10-12 user-information blocks, 10-14 user-information blocks, 10-16 user-information blocks, 10-18 user-information blocks, 10-20 user-information blocks, 10-22 user-information blocks, 10-24 user-information blocks, 10-26 user-information blocks, 10-28 user-information blocks, 10-30 user-information blocks, 10-32 user-information blocks, 10-34 user-information blocks, 10-36 user-information blocks, 10-38 user-information blocks, 10-40 user-information blocks, 10-42 user-information blocks, 10-44 user-information blocks, 10-46 user-information blocks, 10-48 user-information blocks, 10-50 user-information blocks, 10-52 user-information blocks, 10-54 user-information blocks, 10-56 user-information blocks, 10-58 user-information blocks, 10-60 user-information blocks, 10-62 user-information blocks, 10-64 user-information blocks, 10-66 user-information blocks, 10-68 user-information blocks, 10-70 user-information blocks, 10-72 user-information blocks, 10-74 user-information blocks, 10-76 user-information blocks, 10-78 user-information blocks, 10-80 user-information blocks, 10-82 user-information blocks, 10-84 user-information blocks, 10-86 user-information blocks, 10-88 user-information blocks, 10-90 user-information blocks, 10-92 user-information blocks, 10-94 user-information blocks, 10-96 user-information blocks, 10-98 user-information blocks, 10-100 user-information blocks, 12-14 user-information blocks, 12-16 user-information blocks, 12-18 user-information blocks, 12-20 user-information blocks, 12-22 user-information blocks, 12-24 user-information blocks, 12-26 user-information blocks, 12-28 user-information blocks, 12-30 user-information blocks, 12-32 user-information blocks, 12-34 user-information blocks, 12-36 user-information blocks, 12-38 user-information blocks, 12-40 user-information blocks, 12-42 user-information blocks, 12-44 user-information blocks, 12-46 user-information blocks, 12-48 user-information blocks, 12-50 user-information blocks, 12-52 user-information blocks, 12-54 user-information blocks, 12-56 user-information blocks, 12-58 user-information blocks, 12-60 user-information blocks, 12-62 user-information blocks, 12-64 user-information blocks, 12-66 user-information blocks, 12-68 user-information blocks, 12-70 user-information blocks, 12-72 user-information blocks, 12-74 user-information blocks, 12-76 user-information blocks, 12-78 user-information blocks, 12-80 user-information blocks, 12-82 user-information blocks, 12-84 user-information blocks, 12-86 user-information blocks, 12-88 user-information blocks, 12-90 user-information blocks, 12-92 user-information blocks, 12-94 user-information blocks, 12-96 user-information blocks, 12-98 user-information blocks, 12-100 user-information blocks, 14-16 user-information blocks, 14-18 user-information blocks, 14-20 user-information blocks, 14-22 user-information blocks, 14-24 user-information blocks, 14-26 user-information blocks, 14-28 user-information blocks, 14-30 user-information blocks, 14-32 user-information blocks, 14-34 user-information blocks, 14-36 user-information blocks, 14-38 user-information blocks, 14-40 user-information blocks, 14-42 user-information blocks, 14-44 user-information blocks, 14-46 user-information blocks, 14-48 user-information blocks, 14-50 user-information blocks, 14-52 user-information blocks, 14-54 user-information blocks, 14-56 user-information blocks, 14-58 user-information blocks, 14-60 user-information blocks, 14-62 user-information blocks, 14-64 user-information blocks, 14-66 user-information blocks, 14-68 user-information blocks, 14-70 user-information blocks, 14-72 user-information blocks, 14-74 user-information blocks, 14-76 user-information blocks, 14-78 user-information blocks, 14-80 user-information blocks, 14-82 user-information blocks, 14-84 user-information blocks, 14-86 user-information blocks, 14-88 user-information blocks, 14-90 user-information blocks, 14-92 user-information blocks, 14-94 user-information blocks, 14-96 user-information blocks, 14-98 user-information blocks, 14-100 user-information blocks, 16-18 user-information blocks, 16-20 user-information blocks, 16-22 user-information blocks, 16-24 user-information blocks, 16-26 user-information blocks, 16-28 user-information blocks, 16-30 user-information blocks, 16-32 user-information blocks, 16-34 user-information blocks, 16-36 user-information blocks, 16-38 user-information blocks, 16-40 user-information blocks, 16-42 user-information blocks, 16-44 user-information blocks, 16-46 user-information blocks, 16-48 user-information blocks, 16-50 user-information blocks, 16-52 user-information blocks, 16-54 user-information blocks, 16-56 user-information blocks, 16-58 user-information blocks, 16-60 user-information blocks, 16-62 user-information blocks, 16-64 user-information blocks, 16-66 user-information blocks, 16-68 user-information blocks, 16-70 user-information blocks, 16-72 user-information blocks, 16-74 user-information blocks, 16-76 user-information blocks, 16-78 user-information blocks, 16-80 user-information blocks, 16-82 user-information blocks, 16-84 user-information blocks, 16-86 user-information blocks, 16-88 user-information blocks, 16-90 user-information blocks, 16-92 user-information blocks, 16-94 user-information blocks, 16-96 user-information blocks, 16-98 user-information blocks, 16-100 user-information blocks, 18-20 user-information blocks, 18-22 user-information blocks, 18-24 user-information blocks, 18-26 user-information blocks, 18-28 user-information blocks, 18-30 user-information blocks, 18-32 user-information blocks, 18-34 user-information blocks, 18-36 user-information blocks, 18-38 user-information blocks, 18-40 user-information blocks, 18-42 user-information blocks, 18-44 user-information blocks, 18-46 user-information blocks, 18-48 user-information blocks, 18-50 user-information blocks, 18-52 user-information blocks, 18-54 user-information blocks, 18-56 user-information blocks, 18-58 user-information blocks, 18-60 user-information blocks, 18-62 user-information blocks, 18-64 user-information blocks, 18-66 user-information blocks, 18-68 user-information blocks, 18-70 user-information blocks, 18-72 user-information blocks, 18-74 user-information blocks, 18-76 user-information blocks, 18-78 user-information blocks, 18-80 user-information blocks, 18-82 user-information blocks, 18-84 user-information blocks, 18-86 user-information blocks, 18-88 user-information blocks, 18-90 user-information blocks, 18-92 user-information blocks, 18-94 user-information blocks, 18-96 user-information blocks, 18-98 user-information blocks, 18-100 user-information blocks, 20-22 user-information blocks, 20-24 user-information blocks, 20-26 user-information blocks, 20-28 user-information blocks, 20-30 user-information blocks, 20-32 user-information blocks, 20-34 user-information blocks, 20-36 user-information blocks, 20-38 user-information blocks, 20-40 user-information blocks, 20-42 user-information blocks, 20-44 user-information blocks, 20-46 user-information blocks, 20-48 user-information blocks, 20-50 user-information blocks, 20-52 user-information blocks, 20-54 user-information blocks, 20-56 user-information blocks, 20-58 user-information blocks, 20-60 user-information blocks, 20-62 user-information blocks, 20-64 user-information blocks, 20-66 user-information blocks, 20-68 user-information blocks, 20-70 user-information blocks, 20-72 user-information blocks, 20-74 user-information blocks, 20-76 user-information blocks, 20-78 user-information blocks, 20-80 user-information blocks, 20-82 user-information blocks, 20-84 user-information blocks, 20-86 user-information blocks, 20-88 user-information blocks, 20-90 user-information blocks, 20-92 user-information blocks, 20-94 user-information blocks, 20-96 user-information blocks, 20-98 user-information blocks, 20-100 user-information blocks, 22-24 user-information blocks, 22-26 user-information blocks, 22-28 user-information blocks, 22-30 user-information blocks, 22-32 user-information blocks, 22-34 user-information blocks, 22-36 user-information blocks, 22-38 user-information blocks, 22-40 user-information blocks, 22-42 user-information blocks, 22-44 user-information blocks, 22-46 user-information blocks, 22-48 user-information blocks, 22-50 user-information blocks, 22-52 user-information blocks, 22-54 user-information blocks, 22-56 user-information blocks, 22-58 user-information blocks, 22-60 user-information blocks, 22-62 user-information blocks, 22-64 user-information blocks, 22-66 user-information blocks, 22-68 user-information blocks, 22-70 user-information blocks, 22-72 user-information blocks, 22-74 user-information blocks, 22-76 user-information blocks, 22-78 user-information blocks, 22-80 user-information blocks, 22-82 user-information blocks, 22-84 user-information blocks, 22-86 user-information blocks, 22-88 user-information blocks, 22-90 user-information blocks, 22-92 user-information blocks, 22-94 user-information blocks, 22-96 user-information blocks, 22-98 user-information blocks, 22-100 user-information blocks, 24-26 user-information blocks, 24-28 user-information blocks, 24-30 user-information blocks, 24-32 user-information blocks, 24-34 user-information blocks, 24-36 user-information blocks, 24-38 user-information blocks, 24-40 user-information blocks, 24-42 user-information blocks, 24-44 user-information blocks, 24-46 user-information blocks, 24-48 user-information blocks, 24-50 user-information blocks, 24-52 user-information blocks, 24-54 user-information blocks, 24-56 user-information blocks, 24-58 user-information blocks, 24-60 user-information blocks, 24-62 user-information blocks, 24-64 user-information blocks, 24-66 user-information blocks, 24-68 user-information blocks, 24-70 user-information blocks, 24-72 user-information blocks, 24-74 user-information blocks, 24-76 user-information blocks, 24-78 user-information blocks, 24-80 user-information blocks, 24-82 user-information blocks, 24-84 user-information blocks, 24-86 user-information blocks, 24-88 user-information blocks, 24-90 user-information blocks, 24-92 user-information blocks, 24-94 user-information blocks, 24-96 user-information blocks, 24-98 user-information blocks, 24-100 user-information blocks, 26-28 user-information blocks, 26-30 user-information blocks, 26-32 user-information blocks, 26-34 user-information blocks, 26-36 user-information blocks, 26-38 user-information blocks, 26-40 user-information blocks, 26-42 user-information blocks, 26-44 user-information blocks, 26-46 user-information blocks, 26-48 user-information blocks, 26-50 user-information blocks, 26-52 user-information blocks, 26-54 user-information blocks, 26-56 user-information blocks, 26-58 user-information blocks, 26-60 user-information blocks, 26-62 user-information blocks, 26-64 user-information blocks, 26-66 user-information blocks, 26-68 user-information blocks, 26-70 user-information blocks, 26-72 user-information blocks, 26-74 user-information blocks, 26-76 user-information blocks, 26-78 user-information blocks, 26-80 user-information blocks, 26-82 user-information blocks, 26-84 user-information blocks, 26-86 user-information blocks, 26-88 user-information blocks, 26-90 user-information blocks, 26-92 user-information blocks, 26-94 user-information blocks, 26-96 user-information blocks, 26-98 user-information blocks, 26-100 user-information blocks, 28-30 user-information blocks, 28-32 user-information blocks, 28-34 user-information blocks, 28-36 user-information blocks, 28-38 user-information blocks, 28-40 user-information blocks, 28-42 user-information blocks, 28-44 user-information blocks, 28-46 user-information blocks, 28-48 user-information blocks, 28-50 user-information blocks, 28-52 user-information blocks, 28-54 user-information blocks, 28-56 user-information blocks, 28-58 user-information blocks, 28-60 user-information blocks, 28-62 user-information blocks, 28-64 user-information blocks, 28-66 user-information blocks, 28-68 user-information blocks, 28-70 user-information blocks, 28-72 user-information blocks, 28-74 user-information blocks, 28-76 user-information blocks, 28-78 user-information blocks, 28-80 user-information blocks, 28-82 user-information blocks, 28-84 user-information blocks, 28-86 user-information blocks, 28-88 user-information blocks, 28-90 user-information blocks, 28-92 user-information blocks, 28-94 user-information blocks, 28-96 user-information blocks, 28-98 user-information blocks, 28-100 user-information blocks, 30-32 user-information blocks, 30-34 user-information blocks, 30-36 user-information blocks, 30-38 user-information blocks, 30-40 user-information blocks, 30-42 user-information blocks, 30-44 user-information blocks, 30-46 user-information blocks, 30-48 user-information blocks, 30-50 user-information blocks, 30-52 user-information blocks, 30-54 user-information blocks, 30-56 user-information blocks, 30-58 user-information blocks, 30-60 user-information blocks, 30-62 user-information blocks, 30-64 user-information blocks, 30-66 user-information blocks, 30-68 user-information blocks, 30-70 user-information blocks, 30-72 user-information blocks, 30-74 user-information blocks, 30-76 user-information blocks, 30-78 user-information blocks, 30-80 user-information blocks, 30-82 user-information blocks, 30-84 user-information blocks, 30-86 user-information blocks, 30-88 user-information blocks, 30-90 user-information blocks, 30-92 user-information blocks, 30-94 user-information blocks, 30-96 user-information blocks, 30-98 user-information blocks, 30-100 user-information blocks, 32-34 user-information blocks, 32-36 user-information blocks, 32-38 user-information blocks, 32-40 user-information blocks, 32-42 user-information blocks, 32-44 user-information blocks, 32-46 user-information blocks, 32-48 user-information blocks, 32-50 user-information blocks, 32-52 user-information blocks, 32-54 user-information blocks, 32-56 user-information blocks, 32-58 user-information blocks, 32-60 user-information blocks, 32-62 user-information blocks, 32-64 user-information blocks, 32-66 user-information blocks, 32-68 user-information blocks, 32-70 user-information blocks, 32-72 user-information blocks, 32-74 user-information blocks, 32-76 user-information blocks, 32-78 user-information blocks, 32-80 user-information blocks, 32-82 user-information blocks, 32-84 user-information blocks, 32-86 user-information blocks, 32-88 user-information blocks, 32-90 user-information blocks, 32-92 user-information blocks, 32-94 user-information blocks, 32-96 user-information blocks, 32-98 user-information blocks, 32-100 user-information blocks, 34-36 user-information blocks, 34-38 user-information blocks, 34-40 user-information blocks, 34-42 user-information blocks, 34-44 user-information blocks, 34-46 user-information blocks, 34-48 user-information blocks, 34-50 user-information blocks, 34-52 user-information blocks, 34-54 user-information blocks, 34-56 user-information blocks, 34-58 user-information blocks, 34-60 user-information blocks, 34-62 user-information blocks, 34-64 user-information blocks, 34-66 user-information blocks, 34-68 user-information blocks, 34-70 user-information blocks, 34-72 user-information blocks, 34-74 user-information blocks, 34-76 user-information blocks, 34-78 user-information blocks, 34-80 user-information blocks, 34-82 user-information blocks, 34-84 user-information blocks, 34-86 user-information blocks, 34-88 user-information blocks, 34-90 user-information blocks, 34-92 user-information blocks, 34-94 user-information blocks, 34-96 user-information blocks, 34-98 user-information blocks, 34-100 user-information blocks, 36-38 user-information blocks, 36-40 user-information blocks, 36-42 user-information blocks, 36-44 user-information blocks, 36-46 user-information blocks, 36-48 user-information blocks, 36-50 user-information blocks, 36-52 user-information blocks, 36-54 user-information blocks, 36-56 user-information blocks, 36-58 user-information blocks, 36-60 user-information blocks, 36-62 user-information blocks, 36-64 user-information blocks, 36-66 user-information blocks, 36-68 user-information blocks, 36-70 user-information blocks, 36-72 user-information blocks, 36-74 user-information blocks, 36-76 user-information blocks, 36-78 user-information blocks, 36-80 user-information blocks, 36-82 user-information blocks, 36-84 user-information blocks, 36-86 user-information blocks, 36-88 user-information blocks, 36-90 user-information blocks, 36-92 user-information blocks, 36-94 user-information blocks, 36-96 user-information blocks, 36-98 user-information blocks, 36-100 user-information blocks, 38-40 user-information blocks, 38-42 user-information blocks, 38-44 user-information blocks, 38-46 user-information blocks, 38-48 user-information blocks, 38-50 user-information blocks, 38-52 user-information blocks, 38-54 user-information blocks, 38-56 user-information blocks, 38-58 user-information blocks, 38-60 user-information blocks, 38-62 user-information blocks, 38-64 user-information blocks, 38-66 user-information blocks, 38-68 user-information blocks, 38-70 user-information blocks, 38-72 user-information blocks, 38-74 user-information blocks, 38-76 user-information blocks, 38-78 user-information blocks, 38-80 user-information blocks, 38-82 user-information blocks, 38-84 user-information blocks, 38-86 user-information blocks, 38-88 user-information blocks, 38-90 user-information blocks, 38-92 user-information blocks, 38-94 user-information blocks, 38-96 user-information blocks, 38-98 user-information blocks, 38-100 user-information blocks, 40-42 user-information blocks, 40-44 user-information blocks, 40-46 user-information blocks, 40-48 user-information blocks, 40-50 user-information blocks, 40-52 user-information blocks, 40-54 user-information blocks, 40-56 user-information blocks, 40-58 user-information blocks, 40-60 user-information blocks, 40-62 user-information blocks, 40-64 user-information blocks, 40-66 user-information blocks, 40-68 user-information blocks, 40-70 user-information blocks, 40-72 user-information blocks, 40-74 user-information blocks, 40-76 user-information blocks, 40-78 user-information blocks, 40-80 user-information blocks, 40-82 user-information blocks, 40-84 user-information blocks, 40-86 user-information blocks, 40-88 user-information blocks, 40-90 user-information blocks, 40-92 user-information blocks, 40-94 user-information blocks, 40-96 user-information blocks, 40-98 user-information blocks, 40-100 user-information blocks, 42-44 user-information blocks, 42-46 user-information blocks, 42-48 user-information blocks, 42-50 user-information blocks, 42-52 user-information blocks, 42-54 user-information blocks, 42-56 user-information blocks, 42-58 user-information blocks, 42-60 user-information blocks, 42-62 user-information blocks, 42-64 user-information blocks, 42-66 user-information blocks, 42-68 user-information blocks, 42-70 user-information blocks, 42-72 user-information blocks, 42-74 user-information blocks, 42-76 user-information blocks, 42-78 user-information blocks, 42-80 user-information blocks, 42-82 user-information blocks, 42-84 user-information blocks, 42-86 user-information blocks, 42-88 user-information blocks, 42-90 user-information blocks, 42-92 user-information blocks, 42-94 user-information blocks, 42-96 user-information blocks, 42-98 user-information blocks, 42-100 user-information blocks, 44-46 user-information blocks, 44-48 user-information blocks, 44-50 user-information blocks, 44-52 user-information blocks, 44-54 user-information blocks, 44-56 user-information blocks, 44-58 user-information blocks, 44-60 user-information blocks, 44-62 user-information blocks, 44-64 user-information blocks, 44-66 user-information blocks, 44-68 user-information blocks, 44-70 user-information blocks, 44-72 user-information blocks, 44-74 user-information blocks, 44-76 user-information blocks, 44-78 user-information blocks, 44-80 user-information blocks, 44-82 user-information blocks, 44-84 user-information blocks, 44-86 user-information blocks, 44-88 user-information blocks, 44-90 user-information blocks, 44-92 user-information blocks, 44-94 user-information blocks, 44-96 user-information blocks, 44-98 user-information blocks, 44-100 user-information blocks, 46-48 user-information blocks, 46-50 user-information blocks, 46-52 user-information blocks, 46-54 user-information blocks, 46-56 user-information blocks, 46-58 user-information blocks, 46-60 user-information blocks, 46-62 user-information blocks, 46-64 user-information blocks, 46-66 user-information blocks, 46-68 user-information blocks, 46-70 user-information blocks, 46-72 user-information blocks, 46-74 user-information blocks, 46-76 user-information blocks, 46-78 user-information blocks, 46-80 user-information blocks, 46-82 user-information blocks, 46-84 user-information blocks, 46-86 user-information blocks, 46-88 user-information blocks, 46-90 user-information blocks, 46-92 user-information blocks, 46-94 user-information blocks, 46-96 user-information blocks, 46-98 user-information blocks, 46-100 user-information blocks, 48-50 user-information blocks, 48-52 user-information blocks, 48-54 user-information blocks, 48-56 user-information blocks, 48-58 user-information blocks, 48-60 user-information blocks, 48-62 user-information blocks, 48-64 user-information blocks, 48-66 user-information blocks, 48-68 user-information blocks, 48-70 user-information blocks, 48-72 user-information blocks, 48-74 user-information blocks, 48-76 user-information blocks, 48-78 user-information blocks, 48-80 user-information blocks, 48-82 user-information blocks, 48-84 user-information blocks, 48-86 user-information blocks, 48-88 user-information blocks, 48-90 user-information blocks, 48-92 user-information blocks, 48-94 user-information blocks, 48-96 user-information blocks, 48-98 user-information blocks, 48-100 user-information blocks, 50-52 user-information blocks, 50-54 user-information blocks, 50-56 user-information blocks, 50-58 user-information blocks, 50-60 user-information blocks, 50-62 user-information blocks, 50-64 user-information blocks, 50-66 user-information blocks, 50-68 user-information blocks, 50-70 user-information blocks, 50-72 user-information blocks, 50-74 user-information blocks, 50-76 user-information blocks, 50-78 user-information blocks, 50-80 user-information blocks, 50-82 user-information blocks, 50-84 user-information blocks, 50-86 user-information blocks, 50-88 user-information blocks, 50-90 user-information blocks, 50-92 user-information blocks, 50-94 user-information blocks, 50-96 user-information blocks, 50-98 user-information blocks, 50-100 user-information blocks, 52-54 user-information blocks, 52-56 user-information blocks, 52-58 user-information blocks, 52-60 user-information blocks, 52-62 user-information blocks, 52-64 user-information blocks, 52-66 user-information blocks, 52-68 user-information blocks, 52-70 user-information blocks, 52-72 user-information blocks, 52-74 user-information blocks, 52-76 user-information blocks, 52-78 user-information blocks, 52-80 user-information blocks, 52-82 user-information blocks, 52-84 user-information blocks, 52-86 user-information blocks, 52-88 user-information blocks, 52-90 user-information blocks, 52-92 user-information blocks, 52-94 user-information blocks, 52-96 user-information blocks, 52-98 user-information blocks, 52-100 user-information blocks, 54-56 user-information blocks, 54-58 user-information blocks, 54-60 user-information blocks, 54-62 user-information blocks, 54-64 user-information blocks, 54-66 user-information blocks, 54-68 user-information blocks, 54-70 user-information blocks, 54-72 user-information blocks, 54-74 user-information blocks, 54-76 user-information blocks, 54-78 user-information blocks, 54-80 user-information blocks, 54-82 user-information blocks, 54-84 user-information blocks, 54-86 user-information blocks, 54-88 user-information blocks, 54-90 user-information blocks, 54-92 user-information blocks, 54-94 user-information blocks, 54-96 user-information blocks, 54-98 user-information blocks, 54-100 user-information blocks, 56-58 user-information blocks, 56-60 user-information blocks, 56-62 user-information blocks, 56-64 user-information blocks, 56-66 user-information blocks, 56-68 user-information blocks, 56-70 user-information blocks, 56-72 user-information blocks, 56-74 user-information blocks, 56-76 user-information blocks, 56-78 user-information blocks, 56-80 user-information blocks, 56-82 user-information blocks, 56-84 user-information blocks, 56-86 user-information blocks, 56-88 user-information blocks, 56-90 user-information blocks, 56-92 user-information blocks, 56-94 user-information blocks, 56-96 user-information blocks, 56-98 user-information blocks, 56-100 user-information blocks, 58-60 user-information blocks, 58-62 user-information blocks, 58-64 user-information blocks, 58-66 user-information blocks, 58-68 user-information blocks, 58-70 user-information blocks, 58-72 user-information blocks, 58-74 user-information blocks, 58-76 user-information blocks, 58-78 user-information blocks, 58-80 user-information blocks, 58-82 user-information blocks, 58-84 user-information blocks, 58-86 user-information blocks, 58-88 user-information blocks, 58-90 user-information blocks, 58-92 user-information blocks, 58-94 user-information blocks, 58-96 user-information blocks, 58-98 user-information blocks, 58-100 user-information blocks, 60-62 user-information blocks, 60-64 user-information blocks, 60-66 user-information blocks, 60-68 user-information blocks, 60-70 user-information blocks, 60-72 user-information blocks, 60-74 user-information blocks, 60-76 user-information blocks, 60-78 user-information blocks, 60-80 user-information blocks, 60-82 user-information blocks, 60-84 user-information blocks, 60-86 user-information blocks, 60-88 user-information blocks, 60-90 user-information blocks, 60-92 user-information blocks, 60-94 user-information blocks, 60-96 user-information blocks, 60-98 user-information blocks, 60-100 user-information blocks, 62-64 user-information blocks, 62-66 user-information blocks, 62-68 user-information blocks, 62-70 user-information blocks, 62-72 user-information blocks, 62-74 user-information blocks, 62-76 user-information blocks, 62-78 user-information blocks, 62-80 user-information blocks, 62-82 user-information blocks, 62-84 user-information blocks, 62-86 user-information blocks, 62-88 user-information blocks, 62-90 user-information blocks, 62-92 user-information blocks, 62-94 user-information blocks, 62-96 user-information blocks, 62-98 user-information blocks, 62-100 user-information blocks, 64-66 user-information blocks, 64-68 user-information blocks, 64-70 user-information blocks, 64-72 user-information blocks, 64-74 user-information blocks, 64-76 user-information blocks, 64-78 user-information blocks, 64-80 user-information blocks, 64-82 user-information blocks, 64-84 user-information blocks, 64-86 user-information blocks, 64-88 user-information blocks, 64-90 user-information blocks, 64-92 user-information blocks, 64-94 user-information blocks, 64-96 user-information blocks, 64-98 user-information blocks, 64-100 user-information blocks, 66-68 user-information blocks, 66-70 user-information blocks, 66-72 user-information blocks, 66-74 user-information blocks, 66-76 user-information blocks, 66-78 user-information blocks, 66-80 user-information blocks, 66-82 user-information blocks, 66-84 user-information blocks, 66-86 user-information blocks, 66-88 user-information blocks, 66-90 user-information blocks, 66-92 user-information blocks, 66-94 user-information blocks, 66-96 user-information blocks, 66-98 user-information blocks, 66-100 user-information blocks, 68-70 user-information blocks, 68-72 user-information blocks, 68-74 user-information blocks, 68-76 user-information blocks, 68-78 user-information blocks, 68-80 user-information blocks, 68-82 user-information blocks, 68-84 user-information blocks, 68-86 user-information blocks, 68-88 user-information blocks, 68-90 user-information blocks, 68-92 user-information blocks, 68-94 user-information blocks, 68-96 user-information blocks, 68-98 user-information blocks, 68-100 user-information blocks, 70-72 user-information blocks, 70-74 user-information blocks, 70-76 user-information blocks, 70-78 user-information blocks, 70-80 user-information blocks, 70-82 user-information blocks, 70-84 user-information blocks, 70-86 user-information blocks, 70-88 user-information blocks, 70-90 user-information blocks, 70-92 user-information blocks, 70-94 user-information blocks, 70-96 user-information blocks, 70-98 user-information blocks, 70-100 user-information blocks, 72-74 user-information blocks, 72-76 user-information blocks, 72-78 user-information blocks, 72-80 user-information blocks, 72-82 user-information blocks, 72-84 user-information blocks, 72-86 user-information blocks, 72-88 user-information blocks, 72-90 user-information blocks, 72-92 user-information blocks, 72-94 user-information blocks, 72-96 user-information blocks, 72-98 user-information blocks, 72-100 user-information blocks, 74-76 user-information blocks, 74-78 user-information blocks, 74-80 user-information blocks, 74-82 user-information blocks, 74-84 user-information blocks, 74-86 user-information blocks, 74-88 user-information blocks, 74-90 user-information blocks, 74-92 user-information blocks, 74-94 user-information blocks, 74-96 user-information blocks, 74-98 user-information blocks, 74-100 user-information blocks, 76-78 user-information blocks, 76-80 user-information blocks, 76-82 user-information blocks, 76-84 user-information blocks, 76-86 user-information blocks, 76-88 user-information blocks, 76-90 user-information blocks, 76-92 user-information blocks, 76-94 user-information blocks, 76-96 user-information blocks, 76-98 user-information blocks, 76-100 user-information blocks, 78-80 user-information blocks, 78-82 user-information blocks, 78-84 user-information blocks, 78-86 user-information blocks, 78-88 user-information blocks, 78-90 user-information blocks, 78-92 user-information blocks, 78-94 user-information blocks, 78-96 user-information blocks, 78-98 user-information blocks, 78-100 user-information blocks, 80-82 user-information blocks, 80-84 user-information blocks, 80-86 user-information blocks, 80-88 user-information blocks, 80-90 user-information blocks, 80-92 user-information blocks, 80-94 user-information blocks, 80-96 user-information blocks, 80-98 user-information blocks, 80-100 user-information blocks, 82-84 user-information blocks, 82-86 user-information blocks, 82-88 user-information blocks, 82-90 user-information blocks, 82-92 user-information blocks, 82-94 user-information blocks, 82-96 user-information blocks, 82-98 user-information blocks, 82-100 user-information blocks, 84-86 user-information blocks, 84-88 user-information blocks, 84-90 user-information blocks, 84-92 user-information blocks, 84-94 user-information blocks, 84-96 user-information blocks, 84-98 user-information blocks, 84-100 user-information blocks, 86-88 user-information blocks, 86-90 user-information blocks, 86-92 user-information blocks, 86-94 user-information blocks, 86-96 user-information blocks, 86-98 user-information blocks, 86-100 user-information blocks, 88-90 user-information blocks, 88-92 user-information blocks, 88-94 user-information blocks, 88-96 user-information blocks, 88-98 user-information blocks, 88-100 user-information blocks, 90-92 user-information blocks, 90-94 user-information blocks, 90-96 user-information blocks, 90-98 user-information blocks, 90-100 user-information blocks, 92-94 user-information blocks, 92-96 user-information blocks, 92-98 user-information blocks, 92-100 user-information blocks, 94-96 user-information blocks, 94-98 user-information blocks, 94-100 user-information blocks, 96-98 user-information blocks, 96-100 user-information blocks, 98-100 user-information blocks.

In other embodiments, a group of selected user-information blocks may include 2-1000 user-information blocks, such as 2-50 user-information blocks, 2-100 user-information blocks, 2-150 user-information blocks, 2-200 user-information blocks, 2-250 user-information blocks, 2-300 user-information blocks, 2-350 user-information blocks, 2-400 user-information blocks, 2-450 user-information blocks, 2-500 user-information blocks, 2-550 user-information blocks, 2-600 user-information blocks, 2-650 user-information blocks, 2-700 user-information blocks, 2-750 user-information blocks, 2-800 user-information blocks, 2-850 user-information blocks, 2-900 user-information blocks, 2-950 user-information blocks, 50-100 user-information blocks, 50-150 user-information blocks, 50-200 user-information blocks, 50-250 user-information blocks, 50-300 user-information blocks, 50-350 user-information blocks, 50-400 user-information blocks, 50-450 user-information blocks, 50-500 user-information blocks, 50-550 user-information blocks, 50-600 user-information blocks, 50-650 user-information blocks, 50-700 user-information blocks, 50-750 user-information blocks, 50-800 user-information blocks, 50-850 user-information blocks, 50-900 user-information blocks, 50-950 user-information blocks, 50-1000 user-information blocks, 100-150 user-information blocks, 100-200 user-information blocks, 100-250 user-information blocks, 100-300 user-information blocks, 100-350 user-information blocks, 100-400 user-information blocks, 100-450 user-information blocks, 100-500 user-information blocks, 100-550 user-information blocks, 100-600 user-information blocks, 100-650 user-information blocks, 100-700 user-information blocks, 100-750 user-information blocks, 100-800 user-information blocks, 100-850 user-information blocks, 100-900 user-information blocks, 100-950 user-information blocks, 100-1000 user-information blocks, 150-200 user-information blocks, 150-250 user-information blocks, 150-300 user-information blocks, 150-350 user-information blocks, 150-400 user-information blocks, 150-450 user-information blocks, 150-500 user-information blocks, 150-550 user-information blocks, 150-600 user-information blocks, 150-650 user-information blocks, 150-700 user-information blocks, 150-750 user-information blocks, 150-800 user-information blocks, 150-850 user-information blocks, 150-900 user-information blocks, 150-950 user-information blocks, 150-1000 user-information blocks, 200-250 user-information blocks, 200-300 user-information blocks, 200-350 user-information blocks, 200-400 user-information blocks, 200-450 user-information blocks, 200-500 user-information blocks, 200-550 user-information blocks, 200-600 user-information blocks, 200-650 user-information blocks, 200-700 user-information blocks, 200-750 user-information blocks, 200-800 user-information blocks, 200-850 user-information blocks, 200-900 user-information blocks, 200-950 user-information blocks, 200-1000 user-information blocks, 250-300 user-information blocks, 250-350 user-information blocks, 250-400 user-information blocks, 250-450 user-information blocks, 250-500 user-information blocks, 250-550 user-information blocks, 250-600 user-information blocks, 250-650 user-information blocks, 250-700 user-information blocks, 250-750 user-information blocks, 250-800 user-information blocks, 250-850 user-information blocks, 250-900 user-information blocks, 250-950 user-information blocks, 250-1000 user-information blocks, 300-350 user-information blocks, 300-400 user-information blocks, 300-450 user-information blocks, 300-500 user-information blocks, 300-550 user-information blocks, 300-600 user-information blocks, 300-650 user-information blocks, 300-700 user-information blocks, 300-750 user-information blocks, 300-800 user-information blocks, 300-850 user-information blocks, 300-900 user-information blocks, 300-950 user-information blocks, 300-1000 user-information blocks, 350-400 user-information blocks, 350-450 user-information blocks, 350-500 user-information blocks, 350-550 user-information blocks, 350-600 user-information blocks, 350-650 user-information blocks, 350-700 user-information blocks, 350-750 user-information blocks, 350-800 user-information blocks, 350-850 user-information blocks, 350-900 user-information blocks, 350-950 user-information blocks, 350-1000 user-information blocks, 400-450 user-information blocks, 400-

500 user-information blocks, 400-550 user-information blocks, 400-600 user-information blocks, 400-650 user-information blocks, 400-700 user-information blocks, 400-750 user-information blocks, 400-800 user-information blocks, 400-850 user-information blocks, 400-900 user-information blocks, 400-950 user-information blocks, 400-1000 user-information blocks, 450-500 user-information blocks, 450-550 user-information blocks, 450-600 user-information blocks, 450-650 user-information blocks, 450-700 user-information blocks, 450-750 user-information blocks, 450-800 user-information blocks, 450-850 user-information blocks, 450-900 user-information blocks, 450-950 user-information blocks, 450-1000 user-information blocks, 500-550 user-information blocks, 500-600 user-information blocks, 500-650 user-information blocks, 500-700 user-information blocks, 500-750 user-information blocks, 500-800 user-information blocks, 500-850 user-information blocks, 500-900 user-information blocks, 500-950 user-information blocks, 500-1000 user-information blocks, 550-600 user-information blocks, 550-650 user-information blocks, 550-700 user-information blocks, 550-750 user-information blocks, 550-800 user-information blocks, 550-850 user-information blocks, 550-900 user-information blocks, 550-950 user-information blocks, 550-1000 user-information blocks, 600-650 user-information blocks, 600-700 user-information blocks, 600-750 user-information blocks, 600-800 user-information blocks, 600-850 user-information blocks, 600-900 user-information blocks, 600-950 user-information blocks, 600-1000 user-information blocks, 650-700 user-information blocks, 650-750 user-information blocks, 650-800 user-information blocks, 650-850 user-information blocks, 650-900 user-information blocks, 650-950 user-information blocks, 650-1000 user-information blocks, 700-750 user-information blocks, 700-800 user-information blocks, 700-850 user-information blocks, 700-900 user-information blocks, 700-950 user-information blocks, 700-1000 user-information blocks, 750-800 user-information blocks, 750-850 user-information blocks, 750-900 user-information blocks, 750-950 user-information blocks, 750-1000 user-information blocks, 800-850 user-information blocks, 800-900 user-information blocks, 800-950 user-information blocks, 800-1000 user-information blocks, 850-900 user-information blocks, 850-950 user-information blocks, 850-1000 user-information blocks, 900-950 user-information blocks, 900-1000 user-information blocks, 950-1000 user-information blocks.

In other embodiments, a group of selected user-information blocks may include 2-10,000 user-information blocks, such as 2-500 user-information blocks, 2-1000 user-information blocks, 2-1500 user-information blocks, 2-2000 user-information blocks, 2-2500 user-information blocks, 2-3000 user-information blocks, 2-3500 user-information blocks, 2-4000 user-information blocks, 2-4500 user-information blocks, 2-5000 user-information blocks, 2-5500 user-information blocks, 2-6000 user-information blocks, 2-6500 user-information blocks, 2-7000 user-information blocks, 2-7500 user-information blocks, 2-8000 user-information blocks, 2-8500 user-information blocks, 2-9000 user-information blocks, 2-9500 user-information blocks, 500-1000 user-information blocks, 500-1500 user-information blocks, 500-2000 user-information blocks, 500-2500 user-information blocks, 500-3000 user-information blocks, 500-3500 user-information blocks, 500-4000 user-information blocks, 500-4500 user-information blocks, 500-5000 user-information blocks, 500-5500 user-information blocks, 500-6000 user-information blocks, 500-6500 user-information blocks, 500-7000 user-information blocks, 500-7500 user-information blocks, 500-8000 user-information blocks, 500-8500 user-information blocks, 500-9000 user-information blocks, 500-9500 user-information blocks, 500-10,000 user-information blocks, 1000-1500 user-information blocks, 1000-2000 user-information blocks, 1000-2500 user-information blocks, 1000-3000 user-information blocks, 1000-3500 user-information blocks, 1000-4000 user-information blocks, 1000-4500 user-information blocks, 1000-5000 user-information blocks, 1000-5500 user-information blocks, 1000-6000 user-information blocks, 1000-6500 user-information blocks, 1000-7000 user-information blocks, 1000-7500 user-information blocks, 1000-8000 user-information blocks, 1000-8500 user-information blocks, 1000-9000 user-information blocks, 1000-9500 user-information blocks, 1000-10,000 user-information blocks, 1500-2000 user-information blocks, 1500-2500 user-information blocks, 1500-3000 user-information blocks, 1500-3500 user-information blocks, 1500-4000 user-information blocks, 1500-4500 user-information blocks, 1500-5000 user-information blocks, 1500-5500 user-information blocks, 1500-6000 user-information blocks, 1500-6500 user-information blocks, 1500-7000 user-information blocks, 1500-7500 user-information blocks, 1500-8000 user-information blocks, 1500-8500 user-information blocks, 1500-9000 user-information blocks, 1500-9500 user-information blocks, 1500-10,000 user-information blocks, 2000-2500 user-information blocks, 2000-3000 user-information blocks, 2000-3500 user-information blocks, 2000-4000 user-information blocks, 2000-4500 user-information blocks, 2000-5000 user-information blocks, 2000-5500 user-information blocks, 2000-6000 user-information blocks, 2000-6500 user-information blocks, 2000-7000 user-information blocks, 2000-7500 user-information blocks, 2000-8000 user-information blocks, 2000-8500 user-information blocks, 2000-9000 user-information blocks, 2000-9500 user-information blocks, 2000-10,000 user-information blocks, 2500-3000 user-information blocks, 2500-3500 user-information blocks, 2500-4000 user-information blocks, 2500-4500 user-information blocks, 2500-5000 user-information blocks, 2500-5500 user-information blocks, 2500-6000 user-information blocks, 2500-6500 user-information blocks, 2500-7000 user-information blocks, 2500-7500 user-information blocks, 2500-8000 user-information blocks, 2500-8500 user-information blocks, 2500-9000 user-information blocks, 2500-9500 user-information blocks, 2500-10,000 user-information blocks, 3000-3500 user-information blocks, 3000-4000 user-information blocks, 3000-4500 user-information blocks, 3000-5000 user-information blocks, 3000-5500 user-information blocks, 3000-6000 user-information blocks, 3000-6500 user-information blocks, 3000-7000 user-information blocks, 3000-7500 user-information blocks, 3000-8000 user-information blocks, 3000-8500 user-information blocks, 3000-9000 user-information blocks, 3000-9500 user-information blocks, 3000-10,000 user-information blocks, 3500-4000 user-information blocks, 3500-4500 user-information blocks, 3500-5000 user-information blocks, 3500-5500 user-information blocks, 3500-6000 user-information blocks, 3500-6500 user-information blocks, 3500-7000 user-information blocks, 3500-7500 user-information blocks, 3500-8000 user-information blocks, 3500-8500 user-information blocks, 3500-9000 user-information blocks, 3500-9500 user-information blocks, 3500-10,000 user-information blocks, 4000-4500 user-information blocks, 4000-5000 user-information blocks, 4000-5500 user-information blocks, 4000-6000 user-information blocks, 4000-6500 user-information blocks, 4000-7000 user-information blocks, 4000-7500 user-information blocks, 4000-8000 user-information blocks, 4000-8500 user-information blocks, 4000-9000 user-information blocks, 4000-9500 user-information blocks, 4000-10,000 user-information blocks, 4500-5000 user-information blocks, 4500-5500 user-information blocks, 4500-6000 user-information blocks, 4500-6500 user-information blocks, 4500-7000 user-information blocks, 4500-7500 user-information blocks, 4500-8000 user-information blocks, 4500-8500 user-information blocks, 4500-9000 user-information blocks, 4500-9500 user-information blocks, 4500-10,000 user-information blocks, 5000-5500 user-information blocks, 5000-6000 user-information blocks, 5000-6500 user-information blocks, 5000-7000 user-information blocks, 5000-7500 user-information blocks, 5000-8000 user-information blocks, 5000-8500 user-information blocks, 5000-9000 user-information blocks, 5000-9500 user-information blocks, 5000-10,000 user-information blocks, 5500-6000 user-information blocks, 5500-6500 user-information blocks, 5500-7000 user-information blocks, 5500-7500 user-information blocks, 5500-8000 user-information blocks, 5500-8500 user-information blocks, 5500-9000 user-information blocks, 5500-9500 user-information blocks, 5500-10,000 user-information blocks, 6000-6500 user-information blocks, 6000-7000 user-information blocks, 6000-7500 user-information blocks, 6000-8000 user-information blocks, 6000-8500 user-information blocks, 6000-9000 user-information blocks, 6000-9500 user-information blocks, 6000-10,000 user-information blocks, 6500-7000 user-information blocks, 6500-7500 user-information blocks, 6500-8000 user-information blocks, 6500-8500 user-information blocks, 6500-9000 user-information blocks, 6500-9500 user-information blocks, 6500-10,000 user-information blocks, 7000-7500 user-information blocks, 7000-8000 user-information blocks, 7000-8500 user-information blocks, 7000-9000 user-information blocks, 7000-9500 user-information blocks, 7000-10,000 user-information blocks, 7500-8000 user-information blocks, 7500-8500 user-information blocks, 7500-9000 user-information blocks, 7500-9500 user-information blocks, 7500-10,000 user-information blocks, 8000-8500 user-information blocks, 8000-9000 user-information blocks, 8000-9500 user-information blocks, 8000-10,000 user-information blocks, 8500-9000 user-information blocks, 8500-9500 user-information blocks, 8500-10,000 user-information blocks, 9000-9500 user-information blocks, 9000-10,000 user-information blocks, 9500-10,000 user-information blocks.

In embodiments, selected user-information blocks transmit to the client terminal (104) over the network (106). In other embodiments, selected user-information blocks may be provided to the client terminal (104) manually, such as by providing a storage device to a client and the client plugging the storage device into the client terminal (104).

In embodiments, a client terminal (104) may elect one or more selected user-information blocks of the selected user-information blocks that were sent to the client by the application server (100) or content handler (110). In embodiments, choosing one or more selected user-information blocks may simply include clicking one button or more than one button on a keyboard (206) connected to the client terminal (104). In other embodiments, choosing one or more selected user-information blocks may involve interacting with the display medium (110A) on the client-side of the display medium (110A) and hitting an approval button in the display medium (110A), each approval button corresponding to an individual selected user-information block or a set of selected user-information blocks. In embodiments, a client terminal (104) may elect a set of selected user-information blocks of the selected user-information blocks sent to the client by the application server (100) or content handler (110). In embodiments, a client terminal (104) may elect one or more selected user-information blocks of a group of selected user-information blocks sent to the client by the application server (100) or content handler (110). In embodiments, a client terminal (104) may elect a set of selected user-information blocks of a group of selected user-information blocks sent to the client by the application server (100) or content handler (110).

In embodiments, a client terminal (104) may read one or more of a group of selected user-information blocks from the client-side of a display medium (110A). In other embodiments, the application server (100) may include a content viewer, set apart from the content handler (110), wherein the client viewer receives selected user-information blocks and/or final comparing values and organizes the user-information blocks and/or final comparing values on a content-viewer-display medium, such as on a website for the content viewer, a webpage for the content viewer, an application graphical interface for the content viewer, and/or a videogame graphical interface for the content viewer.

In embodiments, the display medium (110A) allows users to manually provide selection data to the application server (100) and/or the content handler (110) via the network (106) through one or more buttons provided by the display medium, such as one or more buttons on a website (304), webpage (306), graphical interface (302), or other similar visual medium, whereof the users may navigate the website (304), webpage (306), graphical interface (302), or other similar visual medium to provide, input, and/or transfer selection data. In embodiments, a user may use a mouse (208) and/or keyboard (206) connected to the user terminal (102A) of the user to manually indicate a selection and send selection data to the application server (100) and/or the content handler (110).

In embodiments, as seen in FIG. 3, a user may place information into an input box (308) on a webpage (306) or graphical interface (302) to send user-information blocks, such as one or more strings of information. In embodiments, placing information, such as user information, into an input box (308) involves physically pressing one or more buttons on a keyboard (206) and/or on a mouse (208). In embodiments, a user may upload information to a webpage (306) and/or an application GUI via a file-upload service (310) of the webpage (306) and/or the application GUI to send user-information blocks, such as one or more files. In embodiments, uploading information, such as user information, via a file-upload service (310) involves physically pressing one or more buttons on a keyboard (206) and/or on a mouse (208).

In other embodiments, the content handler (110) may utilize an AI source to provide one user-information block or more than one user-information blocks to the application server (100) or the client terminal (104). In embodiments, the AI source may operate to filter user-information blocks. In further embodiments, the AI source may operate to filter user-information blocks to create a set of selected user-information blocks. In embodiments, the AI source may aid in determining which user-information blocks should be sent to the client terminal (104) based on the selection data corresponding to the user-information blocks.

A client-matter group of user-information blocks may be a group of user-information blocks corresponding to a client matter. In some embodiments, a client matter may be a matter of work which one or more clients want completed. In other embodiments, a client matter may be a topic for which one or more clients seek information from users.

In embodiments, a specific user terminal (102A) may not read which selected user-information blocks are sent by the application server (100) to the client terminal (104) or sent by the content handler (110) to the client terminal (104).

In some embodiments, the client terminal (104) may send to the user terminal (102A), via the network (106), pre-made digital information, from which the user is to send, to the network (106), at least one user-information block that responds to and corresponds with to the pre-made digital information. Said pre-made digital information may instruct the user terminal (102A) to provide a specific kind of user-information block, such as specific kinds of digital text, digital characters, digital symbols, document files, photo files, digital photos, video files, digital videos, audio files, digital audio, audiovisual files, program files, application files, and any compilations and/or combinations thereof.

In other aspects, a client terminal (104) may send to a user terminal (102A), via a network (106), pre-made digital information that contains option digital information. Option digital information seeks for a user to make a choice given various options. Thus, the user is to send, to the network (106), at least one user-information block responding to and corresponding with a choice made by the user, the choice corresponding to the option digital information comprised within the pre-made digital information. Option digital information would therefore be digital information of which a given user of a user terminal (102A) may make a choice with regard to options within digital information (such as a selection between options) via the user terminal (102A) of the user, and the choice of the user is sent by the user terminal (102A) to the application server (100) as a choice user-information block, which is a type of user-information block that corresponds to the option digital information of the pre-made digital information. Hence, the user sends the choice user-information block into the network (106) and the choice user-information may ultimately reach the application server and/or the client terminal (104) and/or content handler (110). In preferred embodiments, a content handler evaluates choice user-information of the choice user-information block before the choice user-information reaches the client terminal. In embodiments, the client terminal (104) reads a choice user-information block corresponding to a group of option digital information.

In preferred embodiments, the choice user-information block is more specifically a user-information block with at least one datapoint of selection data appended to the user-information block and a digital reference marker appended to said user-information block. In embodiments, the at least one data point of selection data (a selection data point) indicates one count in favor of a choice made related to option digital information thereof, wherein said count may contribute to a choice comparing value, which is a type of comparing value for the choice user-information blocks corresponding with a choice made out of a set of options in the option digital information.

In embodiments, choice user information corresponds to option digital information of pre-made digital information by a digital reference marker. A digital reference marker may be any data or any digital identifier or digital information that connects a user-information block to the option digital information of the pre-made digital information.

In embodiments, user-information blocks corresponding to option digital information of pre-made digital information may be sent to the network (106) by typing and submitting a string, uploading and submitting a file, and/or merely performing one or more clicks of one or more buttons on a keyboard (206) and/or mouse (208) to indicate a choice. In embodiments, submitting a string or uploading a file may also involve clicking a button of a mouse and/or keyboard one or more times.

In embodiments, as shown in FIGS. 1 and 2, the system disclosed herein includes a payment generator (112). In embodiments, the payment generator (112) is operable to send a payment from the client terminal (104) to a user and/or from the application server (100) to a user and/or from a device interacting with the application server (100) to a user. In embodiments, the payment generator (112) receives a trigger indicator transmitted through a network (106) from a client terminal (104) and/or transmitted through a network (106) from the application server (100) and/or transmitted through a network (106) from a device interacting with the application server (100). The trigger indicator is a block that triggers a payment of a capital medium. In embodiments, the payment of the capital medium arrives to a user, such as arriving to a user terminal (102A) of the user or such as arriving to a wallet of the user or such as arriving to a bank of the user. A wallet of the user is any device, physical space, private space, or encrypted space designed to and/or operable to hold a capital medium. In embodiments, a wallet may include a cryptocurrency wallet. In embodiments, the wallet and/or bank of the user may be managed, operated, and/or maintained by an external server. An external server is not a part of the application server (100). In other embodiments, the wallet and/or bank of the user may be managed, operated, and/or maintained by the application server (100). In embodiments, an election of a selected user-information block constitutes a trigger indicator. In other embodiments, an election allows for an application server (100) to send a trigger indicator corresponding to the selected user-information block that the client terminal (104) elected. In other embodiments, an election allows for a device interacting with the application server (100) to send a trigger indicator corresponding to the selected user-information block that the client terminal (104) elected. In other embodiments, an election allows for a client terminal (104) to send a trigger indicator corresponding to the selected user-information block that the client terminal (104) elected.

In embodiments, the trigger indicator corresponds to a client election. In embodiments, the client election of a user-information block corresponds to the user terminal (102A) that sent the user-information block into the network (106). In embodiments, the trigger indicator corresponding to the user terminal (102A) that sent the user-information block into the network (106) triggers a payment from the payment generator (112) to send a capital medium. In embodiments, the capital medium sent by the payment generator (112) arrives at the user terminal (102A) of the user or wallet of the user or bank of the user.

In embodiments, one or more trigger indicators may be sent to a payment generator (112) directly or indirectly by making a selection of one or more selected user-information blocks by a client terminal (104). In embodiments, a selection may be made by a client terminal (104) physically pressing one or more buttons on a mouse (208) and/or keyboard (206) of the user terminal (102A) to select the one or more user-information blocks.

In other embodiments, the payment generator (112) sends a capital medium that is a digital royalty token or a digital representation of royalties, which entitles a user to payments periodically or from time to time based upon royalties accrued by a client as a result of a user-information block that triggered the sending of the digital royalty token.

In embodiments, the capital medium may be a digital token. A digital token may be any form of payment that is digital, and each digital token represents one unit of the digital payment. In embodiments, the capital medium may be an application coin. An application coin is a coin associated with an application (300) formed by the application server (100). The application (300) formed by the application server (100) may be a videogame application, such as a videogame. For example, in some embodiments, a videogame application may be as complex as a massively multiplayer online game or as simple as a mobile Tetris game. In embodiments, the capital medium may be a cryptocurrency. A cryptocurrency may be a digital currency on a decentralized system. In embodiments, the capital medium may be a digital representation of a real currency such as, for example, USD sent over the World Wide Web. In embodiments, the capital medium may be an asset, such as a digital representation of a form of property. Property includes, but is not limited to, tangible items, real property, stocks, bonds, promissory notes, agreement rights having conceivable value, and other common conceptions of assets.

In embodiments, multiple client terminals (104) may read the same selected user-information block. In embodiments, multiple client terminals (104) may read the same group of selected user-information blocks. In embodiments, multiple client terminals (104) may read the same client-matter group of selected user-information blocks.

In embodiments, multiple client terminals may provide an election on the same selected user-information block or group of selected user-information blocks or client-matter group of selected user information blocks. In further embodiments, the selected user-information block for which a trigger indicator may be generated must meet a specific number of elections from the multiple client terminals for the trigger indicator to be generated. In other embodiments, a trigger indicator is generated for the selected user-information block of a client-matter group that receives the most elections from the multiple client terminals.

In embodiments, the payment generator (112) may be part of the application server (100). In embodiments, the payment generator (112) may be external to the application server (100) and merely interacts with the application server (100). In embodiments, the content handler (110) may be part of the application server (100). In embodiments, the content handler (110) may be external to the application server (100).

In some embodiments, users may send, via user terminals of the users, choice user-information blocks corresponding to a group of option digital information to the application server, and a quantifying unit of a content handler may count the selection data appended to the choice user-information blocks. After the content handler has determined which choice of the user-information blocks corresponding to a group of option digital information has a highest choice comparing value, the content handler may activate a content-handler trigger indicator to prompt a payment generator to generate and direct a payment to a wallet and/or bank and/or user terminal of each of the users whose user terminal sent a choice user-information block that corresponds to the highest comparing value. In other embodiments, a user sending, via a user terminal of the user, one or more choice user-information blocks creates a user trigger indicator, prompting a payment generator to generate and direct a payment to a wallet and/or bank and/or user terminal of the user.

In embodiments, the application server (100) is configured to distinguish user terminals (102A) from each other. In embodiments, the application server (100) uses one or more strings of code to set user terminals apart. In embodiments, the application server (100) is configured to distinguish client terminals (104) from each other. In embodiments, the application server (100) uses one or more strings of code to set client terminals apart. In embodiments, the application server (100) is configured to distinguish user terminals (102A) from client terminals (104). In embodiments, the application server (100) uses encoded user badges and encoded client badges to distinguish user terminals (102A) from client terminals (104). Encoded user badges are digital badges with information that identifies a terminal (108) operating as a user terminal (102A). Encoded client badges are digital badges with information that identifies a terminal (108) operating as a client terminal (104). In embodiments, encoded user badges and/or encoded client badges are merely one or more strings of code. In embodiments, encoded user badges and/or encoded client badges may be placed on the communication addresses of a corresponding user terminal (102A) or client terminal (104). A communication address may be a digital address that allows one terminal to send information to another terminal over a network (106).

In embodiments, encoded user badges are distinguished from encoded client badges by information-distinguishing strings. An information-distinguishing string is a string of code or any piece of digital information that is compared with similar strings of code or pieces of digital information, in order to distinguish one device, system, and/or server from another device, system, and/or server.

In embodiments, at least one of the one or more user badges is configured to be provided on at least one display screen (200), such that the user badge shows on a display component of a client terminal (104), a user terminal (102A), a terminal that is a part of the application server, and/or a terminal interacting with the application server. In embodiments, the display medium (110A) is configured to provide a user badge to a display component of a client terminal (104), a user terminal (102A), a terminal that is a part of the application server, and/or a terminal interacting with the application server. In embodiments, the display medium (110A) is configured to provide a client badge on a display component of a client terminal (104), a user terminal (102A), a terminal that is a part of the application server, and/or a terminal interacting with the application server. In embodiments, the display medium (110A) is configured to provide both a user badge and a client badge to a display component of a client terminal (104), a user terminal (102A), a terminal that is a part of the application server, and/or a terminal interacting with the application server. In embodiments, the display medium (110A) is configured to provide both a user badge and a client badge only to one or more display components of one or more client terminals (104) and one or more display components of one or more user terminals (102A).

In embodiments, the capital medium may be transferred to end-users by a method.

In embodiments, information, such as user-information blocks, may be transferred between various user terminals (102A), such as all user terminals and/or such as a plurality of user terminals (102), such that all user terminals and/or a plurality of user terminals (102) may read the user-information blocks. In some embodiments, all user terminals may only read user-information blocks that are filtered out by filtering technology, such as by AI technology capable of filtering out user-information blocks.

In embodiments, user-information blocks are transferred between various user terminals (102A) and an application server (100). In further embodiments, the application server (100) allows the user information blocks to be transferred between all user terminals (102A) and/or a plurality of user terminals (102). In even further embodiments, the application server (100) allows the user information blocks to be transferred between all user terminals (102A) and/or the plurality of user terminals (102) specifically by providing the user-information blocks on a display medium (110A).

In embodiments, user-information blocks are transferred between various user terminals (102A), an application server (100), and one or more client terminals (104). In further embodiments, the application server (100) allows the user information blocks to be transferred between all user terminals (102A) and/or a plurality of user terminals (102) and the one or more client terminals (104). In even further embodiments, the application server (100) allows the user information blocks to be transferred between all user terminals (102A) and/or the plurality of user terminals (102) and the one or more client terminals (104) specifically by providing the user-information blocks on a display medium (110A).

In embodiments, coding may involves typing code by pressing buttons on a physical keyboard and/or typing code by pressing buttons on a mouse to click buttons of a digital keyboard.

Figure 4:
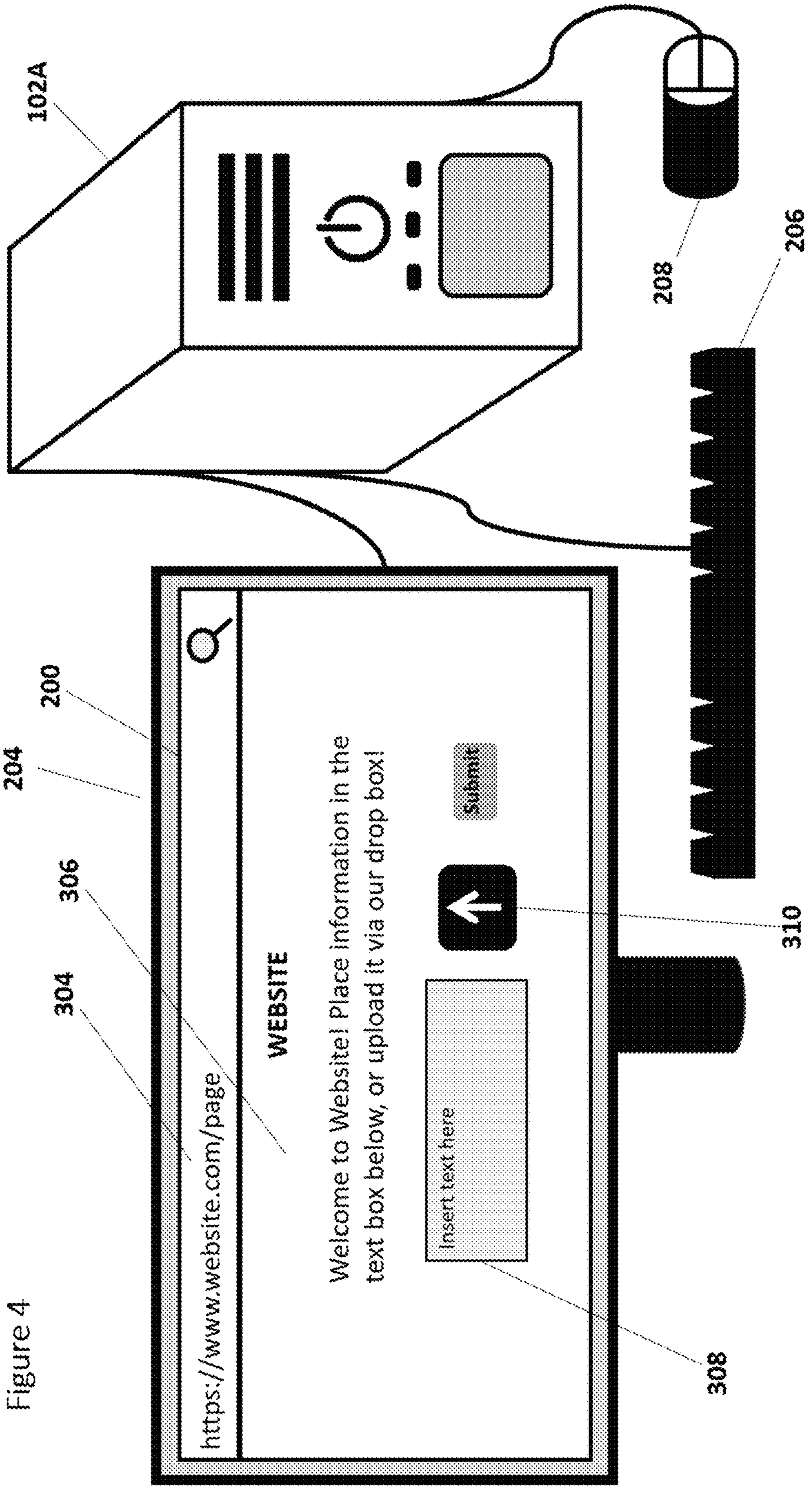
FIG. 4 illustrates an exemplary user terminal with a display screen, keyboard, and mouse interacting with an application and application server through a web page, wherein the application is run via a website (the application being a web app).

In embodiments, such as seen in FIG. 4, a user terminal (102A) is configured to provide at least one user-information block and/or to provide selection data to the network (106). In embodiments, a user terminal (102A) is configured to provide at least one user-information block by, at least in part, accessing an application (300) over the network (106) and connecting to the application (300) for the transfer of information. In other embodiments, a user terminal (102A) is configured to provide at least one user-information block by, at least in part, accessing a webpage (306) or website (304) over the network (106) and connecting to the webpage (306) or website (304) for the transfer of information. In other embodiments, a user terminal (102A) is configured to provide at least one user-information block by, at least in part, coding the user terminal (102A) to send user-information to at least one application (300) and/or at least one application server (100) and/or at least one website (304).

In embodiments, an application server (100) is configured to receive at least some user-information blocks in the network (106). In embodiments, an application server (100) is configured to receive at least some user-information blocks in the network (106) by, at least in part, coding and/or programming the application (300) and/or application server (100) to allow other terminals, such as user terminals (102A), to provide information, such as user-information, over the network (106). In embodiments, the application server (100) accepts and processes user-information sent from a terminal (108) outside of the application server (100), such as a user terminal (102A).

In embodiments, an application server (100) is configured to receive at least some selection data in the network (106). In embodiments, an application server (100) is configured to receive at least some selection data in the network (106) by, at least in part, coding and/or programming the application (300) and/or application server (100) to allow other terminals, such as user terminals (102A), to provide selection data over the network (106). In embodiments, the application server (100) accepts and processes selection data sent from a terminal (108) outside of the application server (100), such as a user terminal (102A).

In embodiments, the application server (100) or at least a main device of the application server may be set apart from the content handler (110) and/or a main device of the content handler, wherein the application server (100) sends user-information and selection data to an external content handler (110) or a main device of the external content handler (110). In other embodiments, the content handler (110) is a part of the application server (100), and a device in the application server (100) that receives user-information and selection data sends the user-information and selection data to the content handler (110) or a device of the content handler.

In embodiments, the application server (100) or a receiving device of the application server is configured to provide one or more of the user-information blocks to the content handler (110) or, more specifically, at least one device of the content handler by, at least in part, coding and/or programming the application (300) and/or application server (100) and/or receiving device of the application server to provide information, such as user-information to the content handler (110) or, more specifically, at least one device of the content handler.

In embodiments, the application server (100) or a receiving device of the application server is configured to provide selection data to the content handler (110) or, more specifically, at least one device of the content handler by, at least in part, coding and/or programming the application (300) and/or application server (100) and/or receiving device of the application server to send selection data to the content handler (110) or, more specifically, at least one device of the content handler.

In embodiments, a display medium (110A) is configured to organize user information of user-information blocks. In embodiments, a display medium (110A) is configured to organize user information of user-information blocks by coding the display medium (110A) to provide user-information to a terminal (108) accessing the display medium (110A). In embodiments, a display medium (110A) is configured to organize user information of user-information blocks by configuring HTML code for the display medium (110A) to allow for a web display of user information of user-information blocks. In embodiments, a display medium (110A) is configured to organize user information of user-information blocks by setting up a file-hosting feature to provide user information of user-information blocks to a terminal (108) accessing the file-hosting feature and/or downloading from the file-hosting feature. In embodiments, a display medium (110A) is configured to organize user information of user-information blocks by setting up a streaming feature to provide user information of user-information blocks to a terminal (108) accessing the streaming feature by streaming the user information of user-information blocks in real time. In embodiments, a display medium (110A) is configured to organize user information of user-information blocks by setting up a file-hosting feature and/or file-sharing feature to provide user information to a terminal (108) accessing the file-hosting feature and/or file-sharing feature and/or downloading from the file-hosting feature and/or file-sharing feature.

In embodiments, a display medium (110A) is configured to organize selection data by coding the display medium (110A) to provide selection data to a terminal (108) accessing the display medium (110A). In embodiments, a display medium (110A) is configured to organize selection data by configuring HTML and/or CSS code for the display medium (110A) to allow for a web display of selection data. In embodiments, a display medium (110A) is configured to organize selection data by creating an application graphical interface (302) for the display medium (110A) to allow for an application display of selection data.

In embodiments, a display medium (110A) is configured to organize one or more comparing values by coding the display medium (110A) to provide comparing values to a terminal (108) accessing the display medium (110A). In embodiments, a display medium (110A) is configured to organize one or more comparing values by coding the display medium (110A) to provide comparing values, appended to its corresponding user-information block, to a terminal (108) accessing the display medium (110A). In embodiments, a display medium (110A) is configured to organize one or more comparing values by setting up HTML and/or CSS code for the display medium (110A) to allow for a web display of the one or more comparing values appended to its corresponding user-information block. In embodiments, a display medium (110A) is configured to organize one or more comparing values by creating an application graphical interface (302) for the display medium (110A) to allow for an application (300) display of the one or more comparing values appended to its corresponding user-information block.

In embodiments, the display medium (110A) is configured to provide user terminals (102A) an input box (308) to input user-information blocks. In embodiments, the input box (308) is provided by placing the input box (308) on a webpage (306) of a website (304). In embodiments, the input box (308) is provided by placing the input box (308) into the graphical interface (302) of an application (300). In embodiments, the input box (308) is provided by borrowing an external input box and integrating the external input box into the operations of the application. In embodiments, the input box (308) is provided by embedding an external input box and integrating the external input box into the application (300) by use of an iframe, such as embedding an external input box into a website (304) of the application (300) or embedding an external input box into a graphical interface (302) of the application (300).

In embodiments, a quantifying unit (110B) is configured to count a set of selection data corresponding to each of one or more user-information blocks. In embodiments, a quantifying unit (110B) is configured to count a set of selection data corresponding to each of one or more user-information blocks by coding the quantifying unit (110B) to add up and/or subtract a set of selection data corresponding to each of one or more user-information blocks. In embodiments, a quantifying unit (110B) is configured to count a set of selection data corresponding to each of one or more user-information blocks by coding the quantifying unit (110B) to account for each piece of selection data corresponding to each of one or more user-information blocks. In embodiments, a quantifying unit (110B) is configured to count a set of selection data corresponding to each of one or more user-information blocks by coding the quantifying unit (110B) to index pieces of selection data and/or sets of selection data corresponding to each of one or more user-information blocks. In embodiments, a quantifying unit (110B) is configured to count a set of selection data corresponding to each of one or more user-information blocks by constructing HTML and/or CSS code to account for pieces of selection data and/or a set of selection data corresponding to each of one or more user-information blocks. In embodiments, a quantifying unit (110B) is configured to count a set of selection data corresponding to each of one or more user-information blocks by constructing HTML/CSS code to index selection data and/or a set of selection data corresponding to each of one or more user-information blocks.

In embodiments, a quantifying unit (110B) is configured to create a comparing value for each of one or more of the user-information blocks. In embodiments, a quantifying unit (110B) is configured to create a comparing value for each of one or more of the user-information blocks by coding the quantifying unit (110B) to add up and/or subtract a set of selection data corresponding to each of one or more user-information blocks. In embodiments, a quantifying unit (110B) is configured to create a comparing value for each of one or more of the user-information blocks by coding the quantifying unit (110B) to account for each piece of selection data corresponding to each of one or more user-information blocks. In embodiments, a quantifying unit (110B) is configured to create a comparing value for each of one or more of the user-information blocks by coding the quantifying unit (110B) to index pieces of selection data and/or sets of selection data corresponding to each of one or more user-information blocks. In embodiments, a quantifying unit (110B) is configured to create a comparing value for each of one or more of the user-information blocks by constructing HTML and/or CSS code to account for pieces of selection data and/or a set of selection data corresponding to each of one or more user-information blocks. In embodiments, a quantifying unit (110B) is configured to create a comparing value for each of one or more of the user-information blocks by constructing HTML/CSS code to index selection data and/or a set of selection data corresponding to each of one or more user-information blocks.

In embodiments, the quantifying unit (110B) is configured to provide one or more of the comparing values to the display medium (110A). In embodiments, the quantifying unit (110B) is configured to provide one or more of the comparing values to the display medium (110A) by coding the quantifying unit (110B) to send comparing values to the display medium (110A).

In embodiments, the content handler (110) is configured to provide user information, tied to comparing values, to the client terminal (104). In embodiments, the content handler (110) is configured to provide user information, tied to comparing values, to the client terminal (104) by coding the content handler (110) to provide user information, tied to comparing values, to the client terminal (104). In embodiments, a content handler (110) is part of the application server (100), and the content handler (11) is configured to provide user information, tied to comparing values, to other terminals of the application server (100). In embodiments, a content handler (110) is part of the application server (100), and the content handler (110) is configured to provide user information, tied to comparing values, to other terminals of the application server (100) by coding the content handler (110) to provide user information, tied to comparing values, to other terminals of the application server (100). In embodiments, a content handler (110) is external to the application server (100), and the content handler (110) is configured to provide user-information, tied to comparing values, to the application server (100). In embodiments, a content handler (110) is external to the application server (100), and the content handler (110) is configured to provide user information, tied to comparing values, to the application server (100) by coding the content handler (110) to provide user information tied to comparing values to the application server (100). In embodiments, the application server (100) is configured to provide user information, tied to comparing values, to the client terminal (104). In embodiments, the application server (100) is configured to provide user information, tied to comparing values, to the client terminal (104) by coding the application server (100) to provide user information, tied to comparing values, to the client terminal (104).

In embodiments, information may be transferred between a client terminal (104) connected to a network (106) and an application server (100) connected to the network (106). In embodiments, information may be transferred between a client terminal (104) connected to a network (106) and an application server (100) connected to the network (106) by sending the information over the network (106). In embodiments, information may be transferred between a client terminal (104) connected to a network (106) and an application server (100) connected to the network (106) by creating an application zone that a client terminal (104) can access. In embodiments, information may be transferred between a client terminal (104) connected to a network (106) and an application server (100) connected to the network (106) by a website (304), such as providing the information on a webpage (306) of the website (304). In embodiments, information may be transferred between a client terminal (104) connected to a network (106) and an application server (100) connected to the network (106) by creating a file-hosting service through the application that the client terminal (104) can access. In embodiments, information may be transferred between a client terminal (104) connected to a network (106) and an application server (100) connected to the network (106) by a file-sharing service, such as a file-sharing service internal to the application (300) or a file-sharing service external to the application (300).

In embodiments, the client terminal (104) is configured to read one or more of selected user-information blocks corresponding to a client-matter group of the user-information blocks. In embodiments, the client terminal (104) is configured to read one or more of selected user-information blocks corresponding to a client-matter group of the user-information blocks by viewing a webpage (306). In embodiments, the client terminal (104) is configured to read one or more of selected user-information blocks corresponding to a client-matter group of the user-information blocks by viewing a webpage (306) that user terminals (102A) cannot access. In embodiments, the client terminal (104) is configured to read one or more of selected user-information blocks corresponding to a client-matter group of the user-information blocks by viewing at least some of the graphical interface (302) of the application (300). In embodiments, the client terminal (104) is configured to read one or more of selected user-information blocks corresponding to a client-matter group of the user-information blocks by viewing a portion of the graphical interface (302) of the application (300), a portion that user terminals (102A) cannot access. In embodiments, the client terminal (104) is configured to read one or more of selected user-information blocks corresponding to a client-matter group of the user-information blocks by downloading the user-information blocks. In embodiments, the client terminal (104) is configured to read one or more of selected user-information blocks corresponding to a client-matter group of the user-information blocks by downloading the user-information blocks from a downloading source that user terminals (102A) cannot access. In embodiments, the client terminal (104) is configured to read one or more of selected user-information blocks corresponding to a client-matter group of the user-information blocks by streaming the user-information blocks. In embodiments, the client terminal (104) is configured to read one or more of selected user-information blocks corresponding to a client-matter group of the user-information blocks by streaming the user-information blocks from a streaming source that user terminals (102A) cannot access. In embodiments, the client terminal (104) is configured to read one or more of selected user-information blocks corresponding to a client-matter group of the user-information blocks by accessing data-representations of the selected user-information blocks corresponding to a client-matter group of the user-information blocks. In embodiments, the client terminal (104) is configured to read one or more of selected user-information blocks corresponding to a client-matter group of the user-information blocks by accessing data-representations of the selected user-information blocks corresponding to a client-matter group of the user-information blocks, data-representations that user terminals (102A) cannot access.

In embodiments, the client terminal (104) is configured to cause a trigger indicator by releasing a trigger indicator or by enabling another terminal and/or device to release a trigger indicator. In embodiments, the client terminal (104) is configured to release a trigger indicator, being encoded to correspond to at least one of the selected user-information blocks of the client-matter group of the user-information blocks. In embodiments, the client terminal (104) is configured to release a trigger indicator by coding the client terminal (104) to release trigger indicators. In embodiments, the client terminal (104) is configured to release a trigger indicator by coding the application (300) to allow the client terminal (104) to release trigger indicators through the application (300). In embodiments, the client terminal (104) is configured to release a trigger indicator by coding and/or setting up a website (304) to allow the client terminal (104) to release trigger indicators through the website (304). In embodiments, the client terminal (104) is configured to release a trigger indicator by coding and/or setting up an application (300) and/or website (304) to allow the client terminal (104) to release trigger indicators through the application (300) and/or website (304) upon the client terminal (104) selecting a user-information block of the selected user-information blocks of the client-matter group of the user-information blocks. In embodiments, the client terminal (104) is configured to release a trigger indicator by coding and/or setting up an application (300) and/or website (304) to allow the client terminal (104) to release trigger indicators through the application (300) and/or website (304) upon the client terminal (104) choosing a user terminal (102A) corresponding to a user-information block of the selected user-information blocks of the client-matter group of the user-information blocks of which to send a payment. In embodiments, the client terminal (104) is configured to release a trigger indicator by indirectly releasing the trigger indicator, wherein a terminal (108) apart from the client terminal (104) releases a trigger indicator upon receiving a trigger prompt or trigger indication from the client terminal.

In embodiments, the trigger indicator is encoded to correspond to at least one of selected user-information blocks of a client-matter group of user-information blocks. In embodiments, the trigger indicator is encoded to correspond to 1-2 selected user information blocks of the client-matter group of the user-information blocks. In embodiments, the trigger indicator is encoded to correspond to 1-3 selected user information blocks of the client-matter group of the user-information blocks. In embodiments, the trigger indicator is encoded to correspond to 1-4 selected user information blocks of the client-matter group of the user-information blocks. In embodiments, the trigger indicator is encoded to correspond to 1-5 selected user information blocks of the client-matter group of the user-information blocks. In embodiments, the trigger indicator is encoded to correspond to 1-6 selected user information blocks of the client-matter group of the user-information blocks. In embodiments, the trigger indicator is encoded to correspond to 1-7 selected user information blocks of the client-matter group of the user-information blocks. In embodiments, the trigger indicator is encoded to correspond to 1-8 selected user information blocks of the client-matter group of the user-information blocks. In embodiments, the trigger indicator is encoded to correspond to 1-9 selected user information blocks of the client-matter group of the user-information blocks. In embodiments, the trigger indicator is encoded to correspond to 1-10 selected user information blocks of the client-matter group of the user-information blocks. In embodiments, the trigger indicator is encoded to correspond to 1-11 selected user information blocks of the client-matter group of the user-information blocks. In embodiments, the trigger indicator is encoded to correspond to 1-12 selected user information blocks of the client-matter group of the user-information blocks. In embodiments, the trigger indicator is encoded to correspond to 1-15 selected user information blocks of the client-matter group of the user-information blocks. In embodiments, the trigger indicator is encoded to correspond to 1-20 selected user information blocks of the client-matter group of the user-information blocks. In embodiments, the trigger indicator is encoded to correspond to 1-25 selected user information blocks of the client-matter group of the user-information blocks. In embodiments, the trigger indicator is encoded to correspond to 1-30 selected user information blocks of the client-matter group of the user-information blocks. In embodiments, the trigger indicator is encoded to correspond to 1-40 selected user information blocks of the client-matter group of the user-information blocks. In embodiments, the trigger indicator is encoded to correspond to 1-50 selected user information blocks of the client-matter group of the user-information blocks. In embodiments, the trigger indicator is encoded to correspond to 1-75 selected user information blocks of the client-matter group of the user-information blocks. In embodiments, the trigger indicator is encoded to correspond to 1-100 selected user information blocks of the client-matter group of the user-information blocks. In embodiments, the trigger indicator is encoded to correspond to 1-1000 selected user information blocks of the client-matter group of the user-information blocks. In embodiments, the trigger indicator is encoded to correspond to 1-10,000 selected user information blocks of the client-matter group of the user-information blocks. In embodiments, the trigger indicator is encoded to correspond to 1-100,000 selected user information blocks of the client-matter group of the user-information blocks. In embodiments, the trigger indicator is encoded to correspond to 1-1,000,000 selected user information blocks of the client-matter group of the user-information blocks.

In embodiments, an amount of the capital medium may be sent by way of a payment generator (112) configured to receive a trigger indicator and configured to transfer an amount of capital medium to one or more wallets corresponding to a user terminal (102A) corresponding to at least one of selected user-information blocks of a client-matter group of user-information blocks. In embodiments, the payment generator (112) is configured to receive the trigger indicator by coding the payment generator (112) to accept a trigger indicator. In embodiments, a payment generator (112) is configured to transfer an amount of the capital medium to one or more wallets corresponding to a user terminal (102A) corresponding to the at least one of selected user-information blocks of a client-matter group of user-information blocks by coding the payment generator (112) to transfer amounts of one or more capital mediums to a wallet. In embodiments, a payment generator (112) is configured to transfer an amount of the capital medium to one or more user terminals (102A) corresponding to the at least one of selected user-information blocks of a client-matter group of user-information blocks by coding the payment generator (112) to transfer amounts of one or more capital mediums to a user terminal.

In embodiments, a national currency is transferred as the amount of capital medium. In embodiments, the national currency is transferred as the amount of capital medium by configuring the payment generator (112) to produce a digital representation of the national currency and send the digital representation of the national currency to a terminal (108) to which payment is to be sent or to a wallet to which payment is to be sent. In embodiments, the national currency is transferred as the amount of capital medium by sending a national currency or data validating intent to transfer a national currency to a bank account. In embodiments, the national currency is transferred as the amount of capital medium by sending a national currency or data validating intent to transfer a national currency to an online bank account.

In embodiments, the application server (100) is configured to authenticate user terminals (102A) through an authentication validation. In embodiments, an authentication validation may be an identity-confirming system. In embodiments, an authentication validation may be a user confirmation system, wherein a user provides confirmation information on a terminal (108) to validate an identity of the user and thereby authenticate the terminal of the user as the user terminal (102A) corresponding to the user. In embodiments, an authentication validation may be a blockchain confirmation system, where the user enters a code for an encrypted blockchain space to validate the identity of the user on the terminal of the user and thereby authenticate the terminal of the user as a user terminal (102A) corresponding to the user. In embodiments, an authentication validation may be a confirmation of an I.P. address of a user to validate the identity of the user and thereby authenticate the terminal of the user as a user terminal (102A) corresponding to the user. In embodiments, an authentication validation may be a confirmation of a device I.P. address of a user to validate the identity of the user and thereby authenticate the terminal of the user as a user terminal (102A) corresponding to the user. In embodiments, an authentication validation may be a confirmation of a network I.P. address of a user to validate the identity of the user and thereby authenticate the terminal of the user as a user terminal (102A) corresponding to the user. In embodiments, an authentication validation may be a confirmation of a device and network I.P. address of a user to validate the identity of the user and thereby authenticate the terminal of the user as a user terminal (102A) corresponding to the user. In embodiments, an authentication validation may be a digital ID verification of a user to validate the identity of the user and thereby authenticate the terminal of the user as a user terminal (102A) corresponding to the user. In embodiments, an authentication validation may be an encrypted account on a website (304), wherein the user enters a string identifier and a code to validate the identity of the user and thereby authenticate the terminal of the user as a user terminal (102A) corresponding to the user. In embodiments, an authentication validation may be an encrypted account on an application (300), wherein the user enters a string identifier and a code to validate the identity of the user and thereby authenticate the terminal of the user as a user terminal (102A) corresponding to the user. In embodiments, the application (300) and the website (304) operate together, and an authentication validation may be an encrypted account on an application (300) and on a corresponding website (304), wherein the user enters a string identifier and a code to validate the identity of the user and thereby authenticate the terminal of the user as a user terminal (102A) corresponding to the user.

In embodiments, the application server (100) is configured to perform a removal act. A removal act may be removing information sent to the application server (100) over the network (106), including user-information blocks and selection data. In embodiments, the application server (100) is configured to perform a removal act on user-information blocks and/or selection data. In embodiments, the application server (100) is configured to perform a removal act on user-information blocks and/or selection data before the user-information blocks and/or selection data reach the content handler (110). In embodiments, the application server (100) is configured to perform a removal act on user-information blocks and/or selection data after the user-information blocks and/or selection data reach the content handler (110). In embodiments, the application server (100) is configured to perform a removal act on user-information blocks and/or selection data before the user-information blocks and/or selection data reach the client terminal (104). In embodiments, the application server (100) is configured to perform a removal act on user-information blocks and/or selection data after the user-information blocks and/or selection data reach the client terminal (104). In embodiments, the application server (100) is configured to perform a removal act by coding the application (300) to vault information, such as user information and/or selection data. In embodiments, the application server (100) is configured to perform a removal act by coding the application (300) to delete information, such as user information and/or selection data. In embodiments, the application server (100) is configured to stop information from being stored on the application server (100), such as user information and/or selection data.

Figure 5:
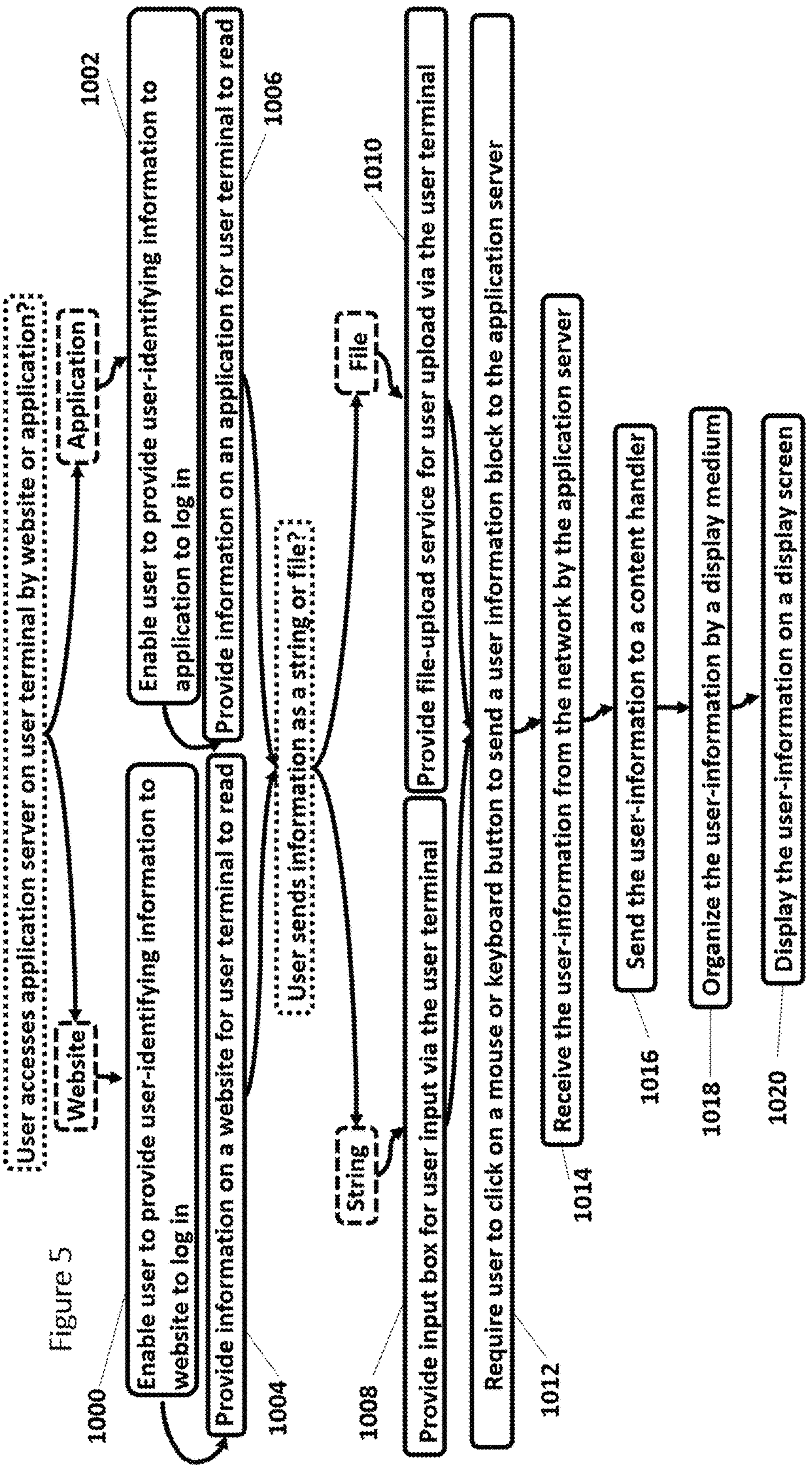
FIG. 5 illustrates an exemplary embodiment of method steps for having a user terminal send user-information blocks to an application server and having user information of the user-information blocks displayed on a display screen.

To display user information, steps may be taken, as exemplified in FIG. 5, to allow users to send user-information blocks for the application server so that the application server may process and display the user-information on a display screen of a client terminal and/or user terminal. A user may access an application server via a website or an application. If the user accesses the application server via a website, the application server may enable the user to provide user-identifying information to the website to log in (1000). If the user accesses the application server via an application (such as a phone application), the application server may enable the user to provide user-identifying information to the application to log in (1002). Next, if the user accesses the application server via a website, the application server may provide information on the website for the user terminal to read (1004). If the user accesses the application server via an application (such as a phone application), the application server may provide information on the application for the user terminal to read (1006). If the user sends information as a string, then the application server provides an input box for user input via the user terminal (1008). If the user sends information as a file, then the application server provides a file-upload service for a user upload via the user terminal (1010). Once a string and/or file is ready to send to the application server, the application server may require the user to click on a mouse or keyboard button to send the information as a user information block to the application server (1012). The application server receives the user-information from the network (1014). The application server sends the user-information to a content handler (1016). The content handler organizes the user-information by a display medium (1018). The application server displays the user-information on a display screen, such as the display screen of a user terminal or a client terminal (1020).

Figure 6:
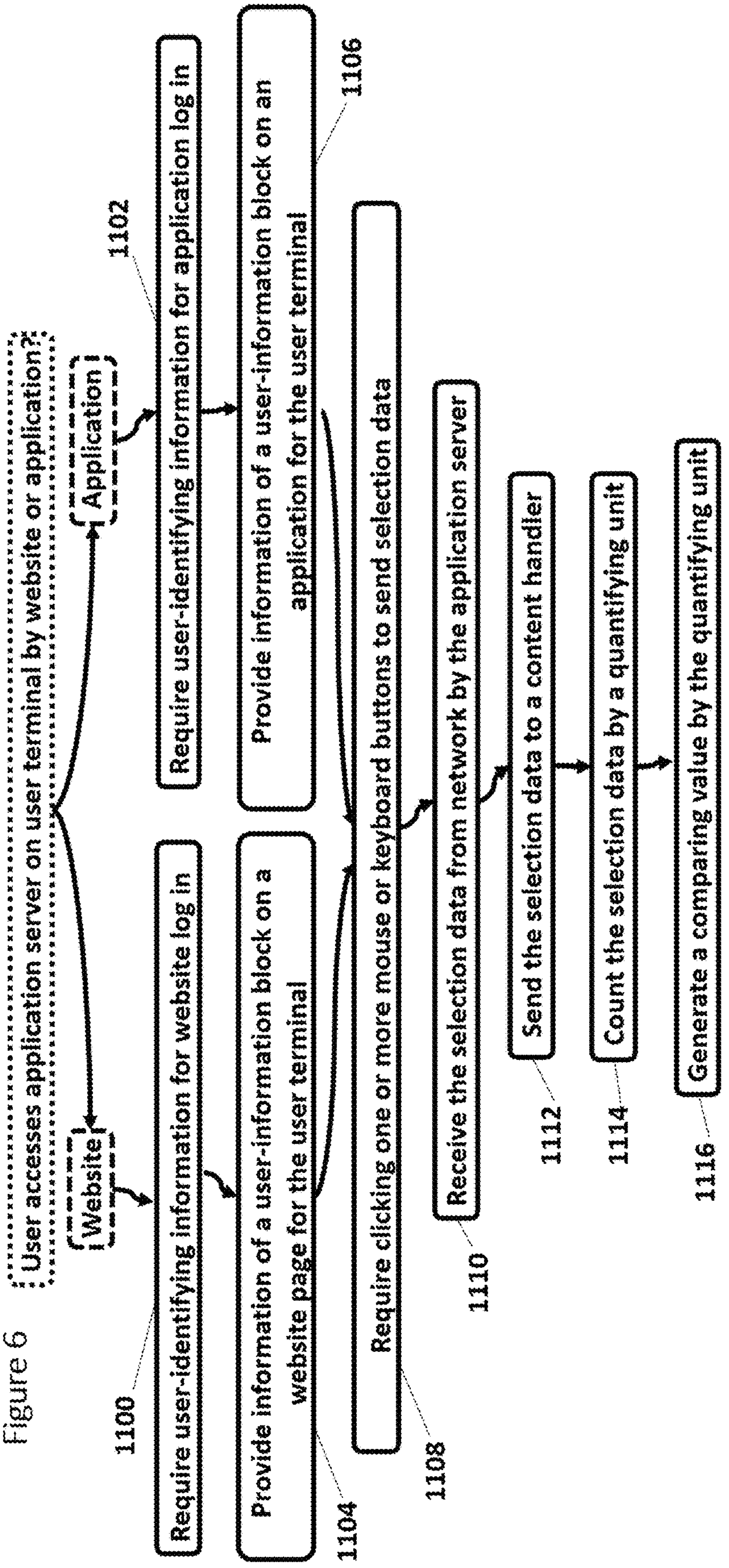
FIG. 6 illustrates an exemplary embodiment of method steps for having a user terminal send selection data to an application server and having the selection data counted by a quantifying unit so that the quantifying unit may generate a comparing value.

To generate a comparing value from the evaluation of selection data, steps may be taken, as exemplified in FIG. 6, to allow users to send selection data and to have the application server receive and evaluate said selection data, which allows the application server to acquire a comparing value. A user may access an application server via a website or an application. If the user accesses the application server via a website, the application server may require user-identifying information for a website log in (1100). If the user accesses the application server via an application (such as a phone application), the application server may require user-identifying information for an application log in (1102). Next, if the user accesses the application server via a website, the application server may provide information of a user-information block on a website page for the user terminal, such that a user terminal may read and evaluate the information of the user-information block (1104). If the user accesses the application server via an application (such as a phone application), the application server may provide information of a user-information block on an application for the user terminal, such that a user terminal may read and evaluate the information of the user-information block (1106). Once the user information has selection data (such as a vote in favor of a user-information block) prepared for a user-information block, the application server may require clicking one or more mouse or keyboard buttons to send selection data (1108). The application server may receive the selection data from the network (1110). The application server may send the selection data to a content handler within the application server or outside of the application sever (1112). The content handler may count the selection data by a quantifying unit (1114). The quantifying unit may generate a comparing value (1116).

Figure 7:
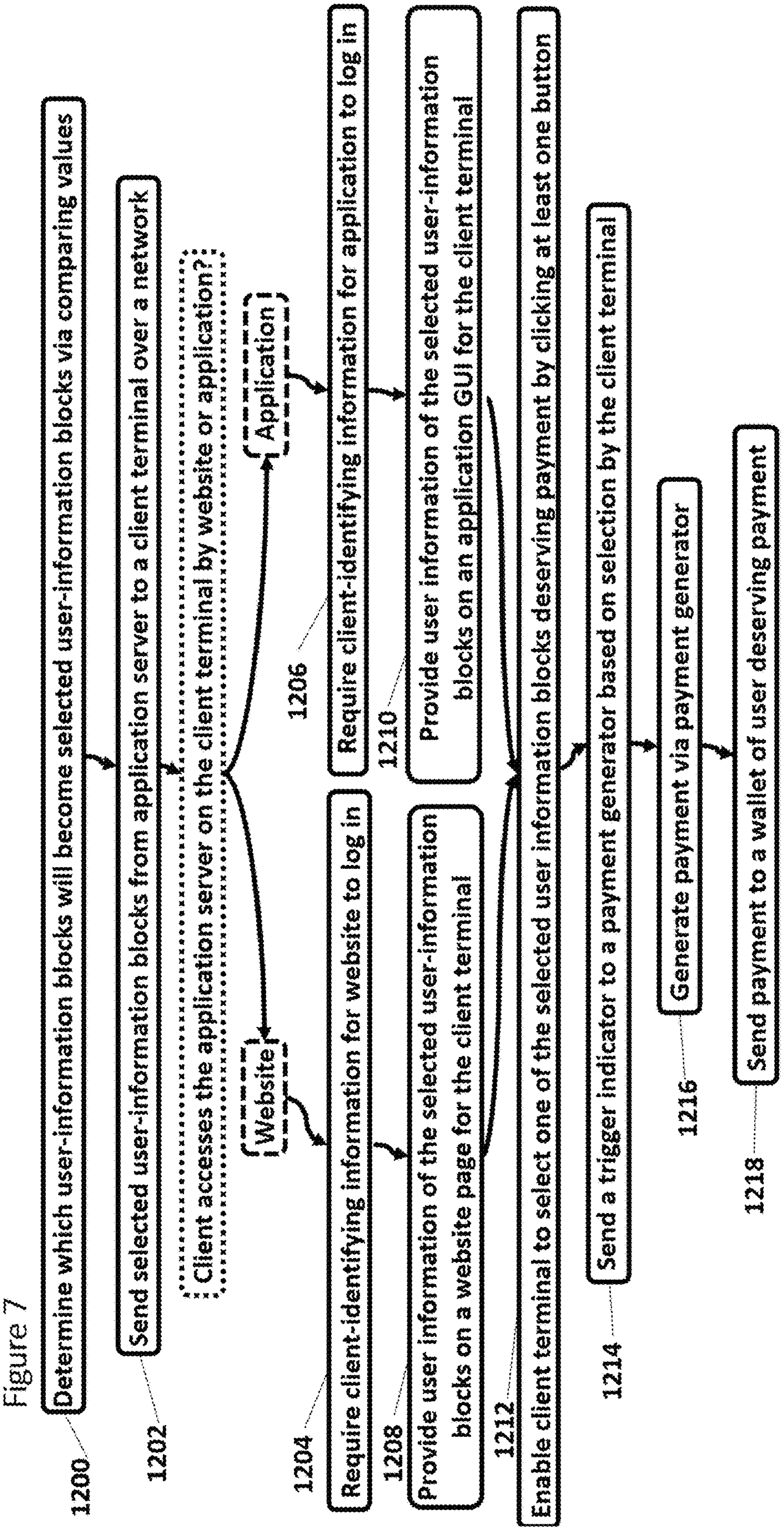
FIG. 7 illustrates an exemplary embodiment of method steps for having a client terminal allow for the sending of a trigger indicator based upon democratically selected user-information blocks.

To send a payment to a user terminal and/or wallet of a user deserving payment, steps may be taken, as exemplified in FIG. 7, to allow the client server to select democratically nominated user-information signals such that the application server directs a capital medium toward the user terminal and/or wallet of the user. The application server determines which user-information blocks will become selected user-information blocks, such as by evaluating the comparing values formed in the content handler (1200). The application server sends user-information blocks from an application server to a client terminal over a network (1202). A client terminal may access the application server via a website or an application. If the client terminal accesses the application server via a website, then the client terminal may require client-identifying information for the website to allow the client to log in (1204). If the client terminal accesses the application server via an application, then the client terminal may require client-identifying information for the application to allow the client to log in (1206). If the client terminal accesses the application server via a website, the application server provides user information of the selected user-information blocks on a website page for the client terminal to read (1208). If the client terminal accesses the application server via an application, the application server provides user information of the selected user-information blocks on an application for the client terminal to read (1210). When the client terminal has read the user information and ready to select one or more of the user information blocks, the application server enables the client terminal to select one of the selected user information blocks deserving payment, such as by allowing the client terminal to click a button for indicating such a selection (1212). Once the client terminal has indicated one or more selections of the selected user information blocks, the application server may enable the client terminal to send a trigger indicator to a payment generator based on selection by the client terminal (1214). The application server may use a payment generator to generate a payment (1216). The payment generator may generate a payment, and the application server may send the payment to a wallet of a user deserving the payment (1218).

Figure 8:
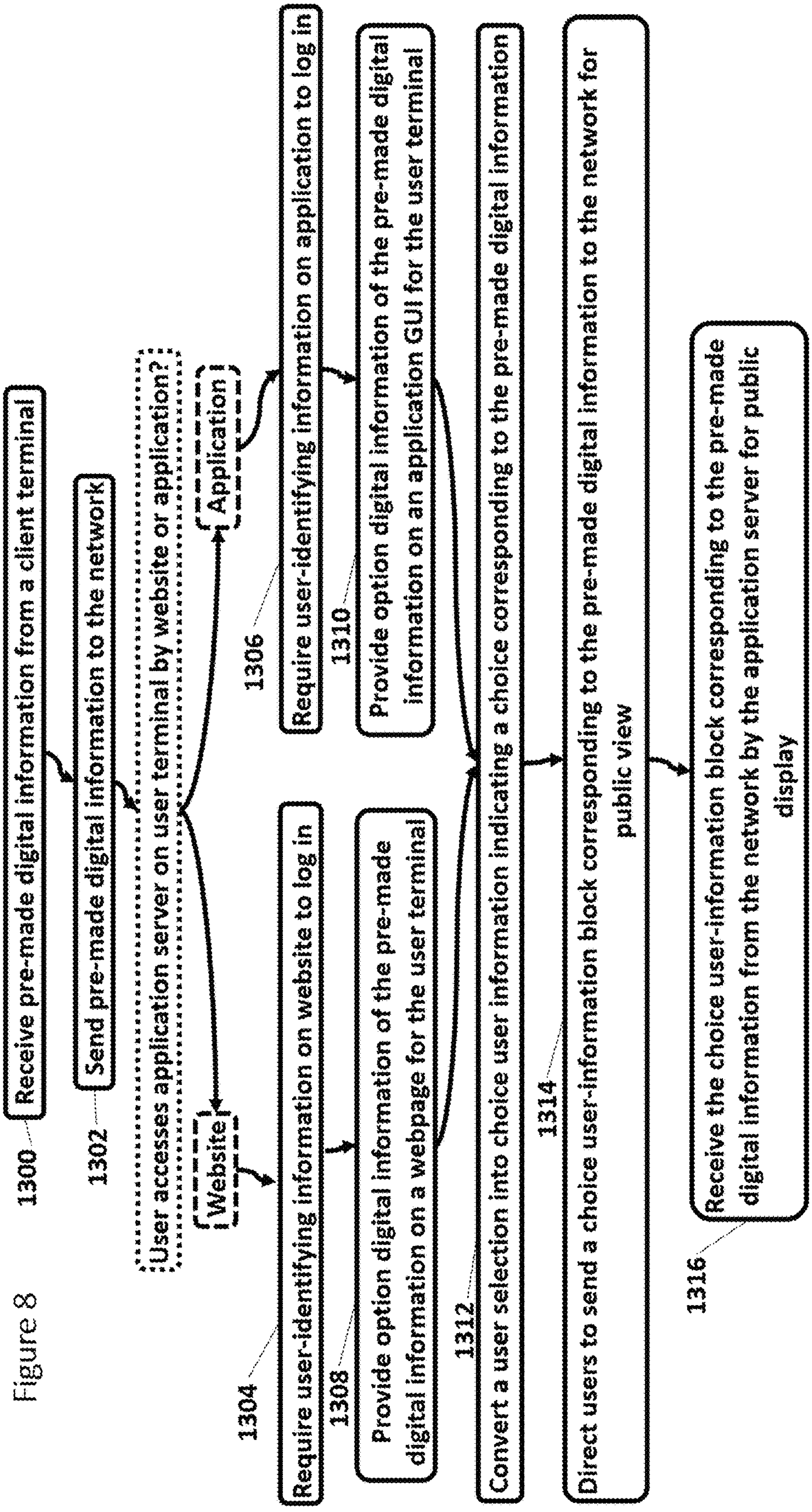
FIG. 8 illustrates an exemplary embodiment of method steps for having a client terminal send pre-made digital information so that a user terminal may send a choice user-information block, corresponding to option digital information of the pre-made digital information, to the application server.

As shown in FIG. 8, application server may allow users to make selections within pre-made digital information to determine which selection of the pre-made digital information warrants a payment to the user terminal and/or a wallet of the user. The application server may receive pre-made digital information from a client terminal (1300). The pre-made information indicates selections for users to select from with their user terminals. The application server then sends the pre-made digital information to the network (1302). A user may access an application server via a website or an application. If the user accesses the application server via a website, the application server may require user-identifying information for a website log in (1304). If the user accesses the application server via an application (such as a phone application), the application server may require user-identifying information for an application log in (1306). Next, if the user accesses the application server via a website, the application server may provide option digital information of the pre-made digital information on a webpage for the user terminal to read (1308). If the user accesses the application server via an application (such as a phone application), the application server may provide option digital information of the pre-made digital information on an application for the user terminal to read (1310). The website or application of the application server then converts a selection of the user (a selection within the option digital information provided to the user) into choice user information indicating a choice corresponding to the pre-made digital information (1312). The website or application of the application server then directs users to send, to the network, a choice-user information block of the choice user information for view by the public (such as a viewing by multiple user terminals and/or client terminals), the choice user-information block corresponding to the pre-made digital information (1314). The application server receives the choice user-information block corresponding to the pre-made digital information for the application server to put on public display (as in display to multiple user terminals and/or client terminals) (1316). Such public display may be a display to only two terminals, only three terminals, only four terminals, only five terminals, only six terminals, only seven terminals, only eight terminals, only nine terminals, or only ten terminals or a display to one to ten terminals, one to twenty terminals, one to one hundred terminals, one to one thousand terminals, or one to ten thousand terminals or a display to an indefinite number of terminals (such as a display to the World Wide Web, accessible to anyone with a terminal that has access to the World Wide Web). The choice user-information block is a type of user-information block with selection data appended thereto. In embodiments, steps found in FIG. 7 may be applied to the choice user-information blocks and the selection data appended thereto, arrived at in FIG. 8, and such choice user-information blocks and selection data appended thereto may thus allow the application server to create comparing values and send a payment to a wallet of a user based on said comparing values. The payment to a wallet of the user may be sent upon a determination by the application server of the highest comparing value when evaluating the comparing values, or a payment to the wallet of the user may be sent upon a determination by the application server of the highest comparing value plus taking into consideration client input, such as a client selection of a preferred selection captured in the pre-made digital data.

The steps found in FIGS. 5-8 are not mutually exclusive, and the steps may be mixed and matched and/or combined together to create different outcomes for how a payment is sent to the user. All the steps found in FIGS. 5-8 provide exemplary embodiments of methods herein and are not exclusive from the inclusion of other steps not mentioned in this description, unless the exclusion of certain actions are expressly stated herein.

In embodiments, the application server is in communication with a plurality of user terminals via connection via a network.

In embodiments, at user terminal may be permitted to provide user-information blocks to one or more application server terminals by encoding a website to enable users to provide user-information blocks to the one or more application server terminals. Such encoding of the website may involve clicking of a mouse one or more times and/or typing on a keyboard one or more times.

In embodiments, at user terminal may be permitted to provide user-information blocks to one or more application server terminals by encoding an application to enable users to provide user-information blocks to the one or more application server terminals. Such encoding of the website may involve clicking of a mouse one or more times and/or typing on a keyboard one or more times.

In embodiments, the application server may allow a user terminal and/or a client terminal to read blocks on a website by coding the website to allow the visit or introduction of a user terminal and/or client terminal to the website such that the user terminal and/or client terminal may read at least some data on the website.

In embodiments, the application server may allow a user terminal and/or a client terminal to read blocks on an application by coding the application to allow the visit or introduction of a user terminal and/or client terminal to the application such that the user terminal and/or client terminal may read at least some data on the application.

In embodiments, the application server may allow a client terminal to cause a trigger indicator by coding the website to interact with client terminals such that clients using client terminals may hit one or more mouse or keyboard buttons or type one or more commands to cause a trigger indicator.

In embodiments, the application server may allow a client terminal to cause a trigger indicator by coding the application to interact with client terminals such that clients using client terminals may hit one or more mouse or keyboard buttons or type one or more commands to cause a trigger indicator.

In embodiments, the client terminal may be allowed to send pre-made digital information to the application server by coding the website and/or application to include at least one button and/or at least one command that a user can click, type, or click and type for the sending of the pre-made digital information.

In embodiments, the application server may allow a user terminal to read pre-made digital information on a website by encoding the website to allow the user terminal to access the website and at least some data therein.

In embodiments, the application server may allow a user terminal to read pre-made digital information on an application by encoding the application to allow the user terminal to access the application and at least some data therein.

In embodiments, a user terminal may be prompted by the application server to send one or more choice user-information blocks by sending prompt information the user terminal, the prompt information prompting a user terminal, via text on the user terminal display screen and/or via audio, click at least one mouse button and/or at least one keyboard button to send the choice-user information to the network.

Herein, the meaning of an "AI source" includes artificial intelligence and any source that uses artificial intelligence. In embodiments, the AI source is wholly external to the application server (300). In embodiments, the AI source is wholly part of the application server (300). In embodiments, the AI source is partially part of the application server (300) and partially external to the application server (300)—such as two components of AI software, one component being part of the application server (300) and one component being external to the application server, the two components interacting together to create one AI source. In embodiments, an AI source may be integrated into the application (300) of the application server (100) and processes thereof. In embodiments, the application server (100) is configured to perform a removal act by using an AI source. In embodiments, the application server (100) is configured to perform a removal act by using an AI source to decipher user-information and/or selection data to remove based on at least one provided criterion. In embodiments, the application server (100) is configured to perform a removal act by using an AI source to decipher which user-information and/or selection data should be vaulted based on at least one provided criterion. In embodiments, the application server (100) is configured to stop information from being stored on the application server (100) by using an AI source to decipher which user-information and/or selection data should be stopped based on at least one provided criterion.

I claim:

1. A digital network-based authentication and validation system for secure transfers to validated end-users over a network, the system comprising:

at least one application server terminal;

a plurality of user terminals connected to a network, one or more of the at least one application server terminal in communication with the plurality of user terminals, at least one user terminal uploading or submitting user-information blocks to the network to send the user-information blocks to the at least one application server terminal, and another at least one user terminal sending selection data for validating the user-information blocks to the at least one application server terminal or another application server terminal;

at least one client terminal connected to the network;

a content handler comprising:

a display medium comprising a graphical interface the display medium of the content handler organizing user information of the one or more of the user-information blocks; and a quantifying unit comprising a device having software, the quantifying unit tabulating, recording, or storing data, the quantifying unit counting a set of selection-data, comprising counts, tallies, tabulations, or itemizations submitted by multiple users via respective user terminals of the multiple users, corresponding to each of the one or more of the user-information blocks and creating a comparing value that combines selection data from multiple user terminals for each of the one or more of the user-information blocks, the comparing value being a value that the quantifying unit provides to the display medium corresponding to a number of counts, tallies, itemizations, or tabulations of the set of selection data corresponding to each of the one or more of the user-information blocks;

an application server connected to the network and maintained by the at least one application server terminal, the application server being configured to:

receive at least one user-information block in the network and selection data for the at least one user-information block in the network, the selection data for the at least one user-information block comprising counts, tallies, tabulations, or itemizations submitted by users by sending the selection data for the at least one user-information block from a user terminal to the application server;

provide one or more of the user-information blocks to the content handler;

filter the user-information blocks based on a comparing value threshold defined as a maximum number of user-information blocks to be selected so that the user-information blocks remaining after being filtered become selected user-information blocks sent to a client terminal of a client-matter group;

allow the at least one client terminal to cause a trigger indicator, the trigger indicator corresponding to at least one of the selected user-information blocks of the client-matter group of the user-information blocks;

an authentication validation executed by the application server, the authentication validation being a blockchain space, an IP-address confirmation, a digital ID verification, an account encryption, or a string identifier for preventing user terminals of the plurality of user terminals from sending fraudulent user-information blocks or fraudulent selection data and for validating one or more end-users for receipt of a capital medium, the authentication validation encoding the application server with a string identifier corresponding to a user terminal; and a payment generator comprising a payment-managing server computer, which sends the capital medium to one or more validated end-users, the payment generator receiving the trigger indicator and transferring an amount of the capital medium to one or more wallets corresponding to each user terminal corresponding to the at least one of the selected user-information blocks of the client-matter group of the user-information blocks.

2. The system of claim 1, wherein the client terminal is allowed to send pre-made digital information to the application server via the network, wherein at least one user terminal is allowed to read option digital information of the pre-made digital information, and wherein the at least one user terminal is prompted by the application server to send one or more choice user-information blocks with at least one selection data point and a digital reference marker, corresponding to the pre-made digital information, appended to the one or more choice user-information blocks.

3. The system of claim 1, wherein the display medium allows each user terminal to manually provide selection data to the application server via the network.

4. The system of claim 1, wherein the capital medium is an application coin.

5. The system of claim 1, wherein the capital medium is a cryptocurrency.

6. The system of claim 1, wherein the content handler interacts with an AI source to provide the client terminal at least one user-information block.

7. The system of claim 1, wherein the application server directly or indirectly maintains the one or more wallets.

8. The system of claim 1, wherein the one or more wallets are a bank account maintained by an external server.

9. A method of validating end-users for receipt of a capital medium using a digital network-based authentication and validation system, the method comprising:

receiving information in a form of user-information blocks from a plurality of user terminals connected to a network by an application server connected to the network;

uploading or submitting to the network, via at least one user terminal, at least one user-information block in order to send the at least one user-information block to at least one application server terminal;

sending selection data via another at least one user terminal for the at least one user-information block through a network to the at least one application server terminal or another application server terminal, the selection data for the at least one user-information block comprising counts, tallies, tabulations, or itemizations submitted by a user;

using a blockchain space, an IP-address confirmation, a digital ID verification, an account encryption, or a string identifier as the authentication validation executed by the application server to prevent user terminals of the plurality of user terminals from sending fraudulent user-information blocks or fraudulent selection data;

receiving, by the application server, at least some user-information blocks transferred via the network and at least some selection data transferred via the network;

providing to a content handler, using a terminal of the application server, one or more of the user-information blocks; providing a display medium, comprising a graphical interface, as part of the content handler, the display medium organizing user information of the one or more of the user-information blocks;

providing a quantifying unit comprising a device having software, the quantifying unit counting a set of selection data, comprising counts tallies, tabulations, or itemizations submitted by multiple users via respective user terminals of the multiple users, corresponding to each of the one or more of the user-information blocks and creating a comparing value that combines selection data from multiple user terminals for each of the one or more of the user-information blocks, the comparing value being a value that the quantifying unit provides to the display medium corresponding to a number of counts, tallies, itemizations, or tabulations of the set of selection data corresponding to each of the one or more of the user-information blocks;

filtering, by the application server, the user-information blocks based on a comparing value threshold or based on a maximum number of user-information blocks to be selected, wherein user-information blocks remaining after filtering are selected user-information blocks and are sent to a client terminal of a client-matter group;

transferring selected user-information blocks to a client terminal connected to a network from the application server connected to the network;

reading, via the client terminal, one or more of the selected user-information blocks corresponding to a client-matter group of the user-information blocks;

creating, using the client terminal, a trigger indicator, the trigger indicator corresponding to at least one of the selected user-information blocks of the client-matter group of the user-information blocks and being encoded with a string identifier corresponding to a user terminal authenticated by the authentication validation; and sending, via a payment generator comprising a payment-managing server computer, which sends a payment to the end-users, an amount of the capital medium, the payment generator receiving the trigger indicator and transferring an amount of the capital medium to one or more wallets corresponding to each user terminal corresponding to the at least one of the selected user-information blocks of the client-matter group of the user-information blocks.

10. The method of claim 9, further comprising allowing the client terminal to send pre-made digital information to the application server via the network, wherein at least one user terminal is allowed to read option digital information of the pre-made digital information, and wherein the at least one user terminal is prompted by the application server to send one or more choice user-information blocks with at least one selection data point and a digital reference marker, corresponding to the pre-made digital information, appended to the one or more choice user-information blocks.

11. The method of claim 9, further comprising configuring the quantifying unit of the content handler to provide one or more of the comparing values to the display medium of the content handler.

12. The method of claim 9, further comprising transferring a national currency as the amount of the capital medium.

13. The method of claim 9, further comprising configuring the application server to authenticate user terminals through the authentication validation using an IP address as the authentication validation.

14. The method of claim 9, further comprising configuring the display medium of the content handler to provide user terminals an input box to input user-information blocks.

15. The method of claim 9, further comprising configuring the application server to perform a removal act upon at least one user-information block.

16. The method of claim 9, further comprising configuring the application server to deploy an AI source to perform a removal act upon at least one user-information block received from the network.

* * * * *